US005293458A

United States Patent [19]

Chung et al.

[11] Patent Number: 5,293,458

[45] Date of Patent: Mar. 8, 1994

[54] MOS MULTI-LAYER NEURAL NETWORK AND ITS DESIGN METHOD

[75] Inventors: Ho-sun Chung; Sin-jin Kim, both of Taegu, Rep. of Korea

[73] Assignee: Samsung Electronics Co., Ltd., Kyunggi

[21] Appl. No.: 745,348

[22] Filed: Aug. 15, 1991

[30] Foreign Application Priority Data

Aug. 18, 1990 [KR] Rep. of Korea .................... 90-12914

[51] Int. Cl.$^5$ .............................................. G06F 15/18

[52] U.S. Cl. ........................................ 395/27; 395/24; 307/201

[58] Field of Search .............................. 395/24, 23, 27

[56] References Cited

U.S. PATENT DOCUMENTS

| | | | |
|---|---|---|---|
| 5,028,810 | 7/1991 | Castro et al. | 307/201 |
| 5,033,006 | 7/1991 | Ishizuka et al. | 364/513 |
| 5,034,918 | 7/1991 | Jeong | 365/49 |
| 5,061,866 | 10/1991 | El-Naggar et al. | 307/529 |
| 5,093,803 | 3/1992 | Howard et al. | 364/807 |
| 5,107,454 | 4/1992 | Niki | 395/24 |
| 5,113,484 | 5/1992 | Jeong | 395/24 |

OTHER PUBLICATIONS

McClelland et al., Explorations in Parallel Distributed Processing, MIT Press, 1988, 2-3, 121-145.

Walker et al., "A CMOS Neural Network for Pattern Association", IEEE Micro, Oct. 1989, 68-74.

Salam et al., "A Feed forward Neural Network for CMOS VLSI Implementation", Midwest Symposium on Circuits & Systems, Aug. 12-14, 1990, 489-492.

Graf et al., "VLSI Implementation of a Neural Network Model", Computer, Mar. 1988, 41-49.

Eberhardt et al., "Design of Parallel Hardware Neural Network Systems from Custom Analog VLSI 'Building Block' Chips", IJCNN, Jun. 18-22, 1989, II-183 to II-190.

*Primary Examiner*—Allen R. MacDonald

*Assistant Examiner*—Robert W. Downs

*Attorney, Agent, or Firm*—Cushman, Darby & Cushman

[57] ABSTRACT

Disclosed is a multi-layer neural network and circuit design method. The multi-layer neural network receiving an m-bit input and generating an n-bit output comprises a neuron having a cascaded pair of CMOS inverters and having an output node of the preceding CMOS inverter among the pair of CMOS inverters as its inverted output node and an output node of the succeeding CMOS inverter as its non-inverted output node, an input layer having m neurons to receive the m-bit input, an output layer having n neurons to generate the n-bit output, at least one hidden layer provided with n neurons to transfer the input received from the input layer to the directly upper hidden layer or the output layer, an input synapse group in a matrix having each predetermined weight value to connect each output of neurons on the input layer to each neuron of the output layer and at least one hidden layer, at least one transfer synapse group in a matrix having each predetermined weight value to connect each output of neurons of the hidden layer to each neuron of its directly upper hidden layer or of the output layer, and a bias synapse group for biasing each input node of neurons of the hidden layers and the output layer.

5 Claims, 3 Drawing Sheets

FIG. 3
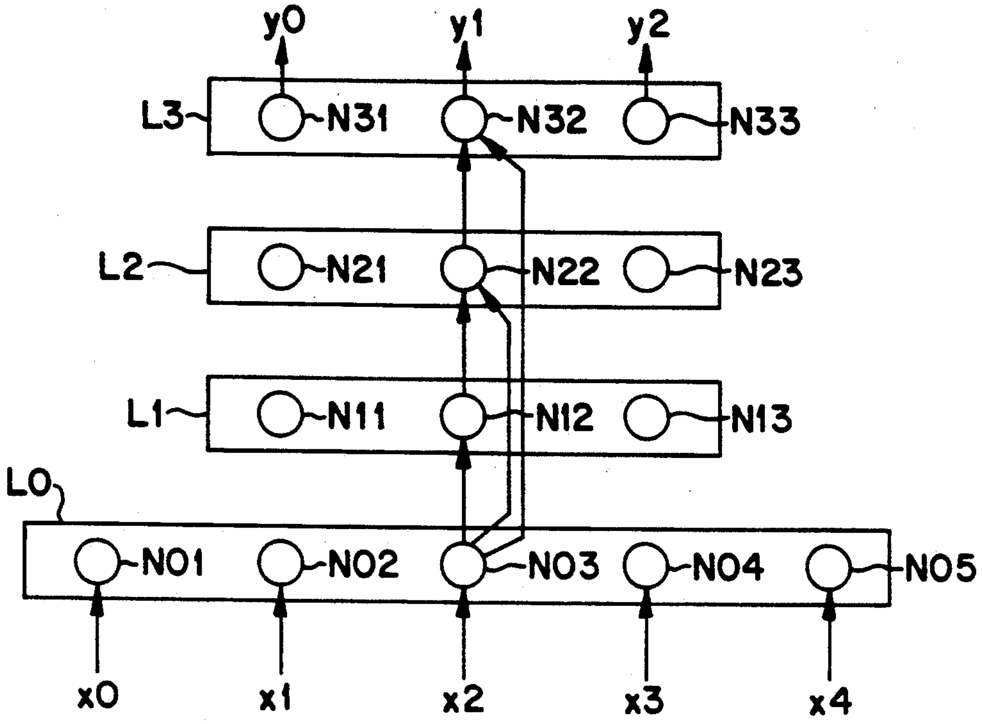
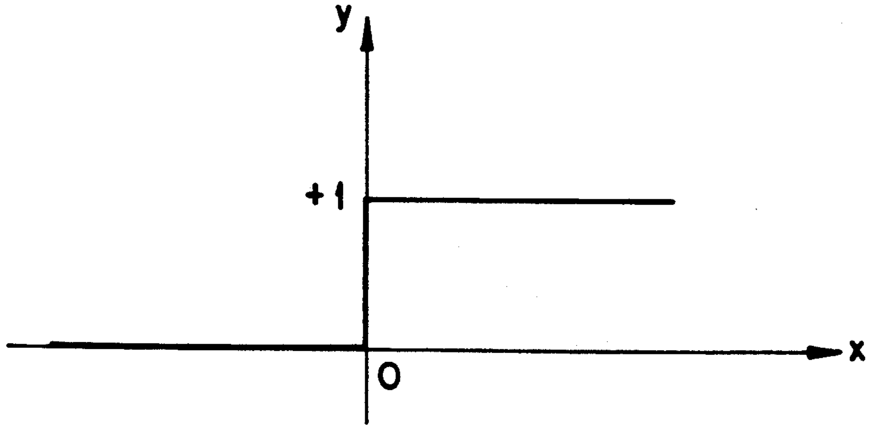
FIG. 4

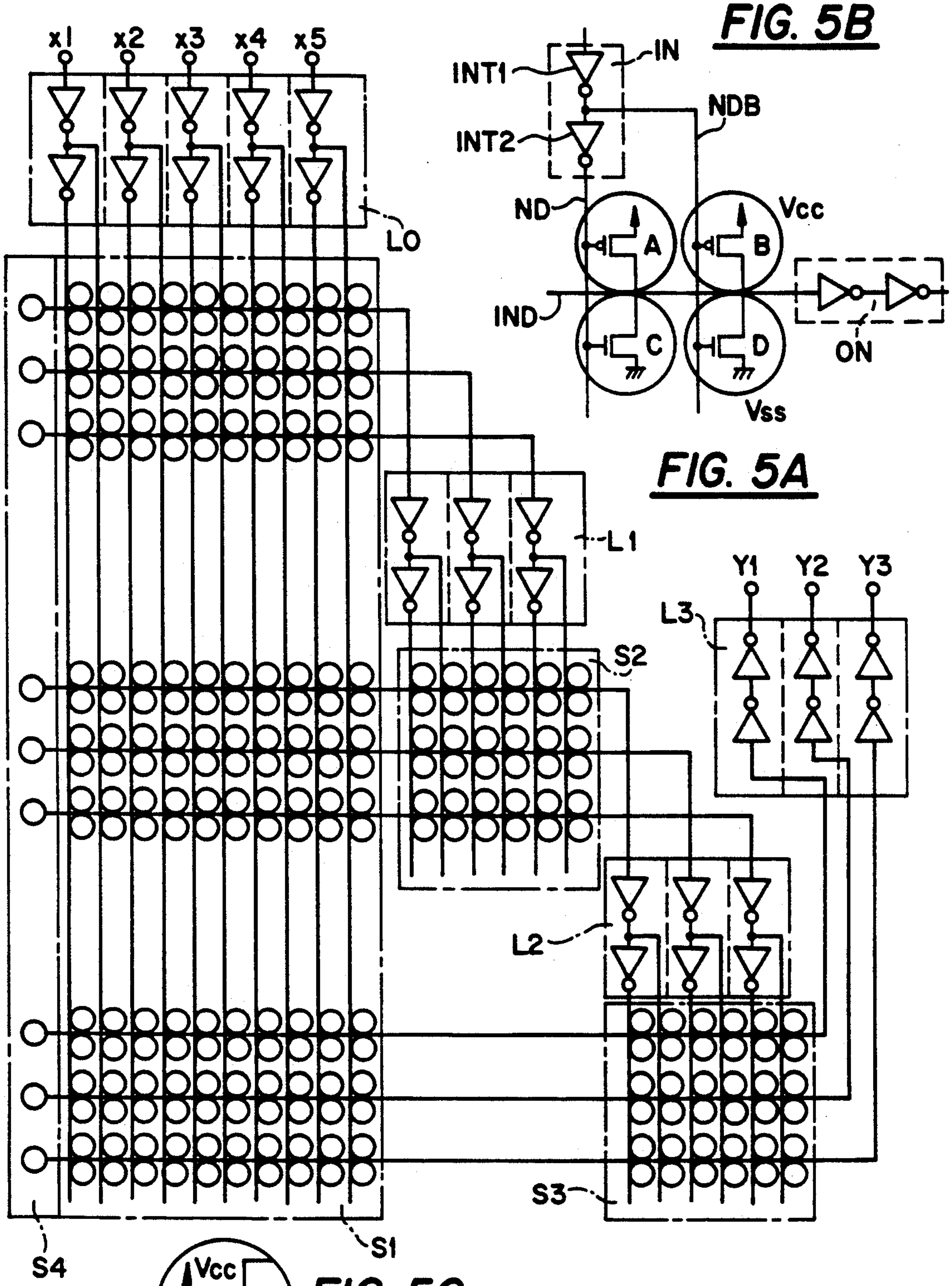
FIG. 5B
FIG. 5A
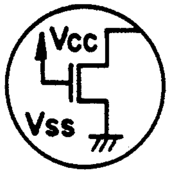
FIG. 5C

MOS MULTI-LAYER NEURAL NETWORK AND ITS DESIGN METHOD

BACKGROUND OF THE INVENTION

1. Field of the Invention

The present invention relates to a MDS multi-layer neural network and its designing method, and more particularly to a multi-layer neural network and the designing method thereof which can easily realize VLSI circuitry for a multi-layer neural network.

2. Description of the Related Art

Recently, in the pattern recognition field, neural networks which can do large-scale parallel processing in real-time have been introduced. In 1988, Hans P. Graf et al. of Bell laboratories, presented a pattern recognizing neural network wherein amplifiers, having their inputs and outputs interconnected through a resistive connecting device in a matrix, constitute synapses and neurons of the neural network, and a pair of switches which switch according to the data in a pair of RAM cells, constitute neuron interconnections.

The present inventor has filed numerous applications including: an adder (U.S. application Ser. No. 07/473,653), a multiplier (07/473,633), an A/D converter (07/473,631, 07/473,634), a pattern classifier (07/473,464), etc. These related applications disclose a neural network having synapses constructed using PMOS and/or NMOS transistors, and including neurons made from buffers in the form of cascaded pairs of CMOS inverters. The aforementioned neural circuits are based on a one-layer neural network model and solve only linearly separable problems, but not linearly unseparable problems (non-linear problems). Accordingly, their application is extremely limited. For instance, an XOR circuit cannot be properly modelled by a one-layer neural network. The limitations of one-layer neural networks are overcome by properly designed multi-layer neural networks. It is known that a neural network can learn by a back-propagation algorithm (refer to IEEE ASSP MAGAZINE, pages 4 to 22, April, 1987).

There are more restrictions, however, in the hardware implementation of multi-layer neural networks than in software simulated algorithms in a computer. This is due to the fact that hardware implementation of a multi-layer neural network depends on current VLSI technology. As a result, circuit implementation of connection weight values for neural circuits and non-linear functions is not as readily attainable as with software simulated algorithms. Although real number calculations with floating point operation and also neural network models requiring increased interconnection capability can be achieved using software, such software implemented operations become difficult with VLSI technology.

SUMMARY OF THE INVENTION

It is an object of the present invention to provide a multi-layer neural network having integer connecting weight values and a step function, to solve the problem of the conventional technique.

It is another object of the present invention to provide a circuit design method of a multi-layer neural network for designing the multi-layer neural network according to the new learning rule.

To achieve the object, the multi-layer neural network of the present invention receiving an m-bit input and generating an n-bit output comprises:

a neuron for cascading a pair of CMOS inverters and having an output node of the preceding CMOS inverter among the pair of CMOS inverters as its inverted output node and an output node of the succeeding CMOS inverter as its non-inverted output node;

an input layer having m neurons to receive the m-bit input;

an output layer having n neurons to generate the n-bit output;

at least one hidden layer provided with n neurons to transfer the input received from the input layer to the directly upper hidden layer or the output layer;

an input synapse group on a matrix having each predetermined weight value to connect each output of neurons on the input layer to each neuron of the output layer and at least one hidden layer;

at least one transfer synapse group in a matrix having each predetermined weight-value to connect each output of neurons of the hidden layer to each neuron of its directly upper hidden layer or of the output layer; and a bias synapse group for biasing each input node of neurons of the hidden layers and the output layer.

Here, the input synapse group, the transfer synapse group and the bias synapse group are constructed by PMOS and NMOS transistors.

There is also provided a method for designing the above described multi-layer neural network for receiving an m-bit input and generating an n-bit output, which comprises:

a first step of initializing the connection weight value of the input synapse group;

a second step of setting the m-bit input value and an n-bit desired output value corresponding to the input value;

a third step of obtaining the sum of the input weight values at the input node of each neuron of the output layer and generating an actual output by a step function;

a fourth step of comparing the actual output value obtained in the third step, with the desired output value set in the second step to calculate the error, and storing the variation of the weight value calculated according to the error value;

a fifth step of terminating the learning if each output value equals its desired output value, or if not, obtaining the sum of the stored variation of the weight value and adding it to each current weight value to obtain a new weight value, after the second step through the fourth step are carried out with respect to $2^m$ input and output pairs;

a sixth step of reducing each weight value by a predetermined ratio, when the sum of the new weight value obtained in the fifth step in the input node of each neuron of the output layer is above a predetermined value; and a seventh step of using the output layer as a hidden layer, incrementing the new output layer, and repeating the process beginning with the second step using the output of the hidden layer and the original input as new inputs, when the desired result is not obtained after repeating the learning upto the sixth step by the predetermined times of repetitions.

BRIEF DESCRIPTION OF THE DRAWINGS

The above objects and other advantages of the present invention will become more apparent by describing the preferred embodiment of the present invention with reference to the attached drawings, in which:

FIG. 3 is a concept diagram of a multi-layer neural network according to the present invention;

FIG. 4 is a characteristic graphic diagram of a step function used in the learning of the multi-layer neural network according to the present invention;

FIG. 5A is a circuit diagram of an embodiment of the multi-layer neural network according to the present invention;

FIG. 5B is a partial circuit diagram for explaining the synapse structure of FIG. 5A; and FIG. 5C is a common transistor representation of each circle element shown in bias synapse group S4 of FIG. 5A.

DETAILED DESCRIPTION OF THE INVENTION

Hereinafter, the present invention will be described with reference to the accompanying drawings.

Figure 1:
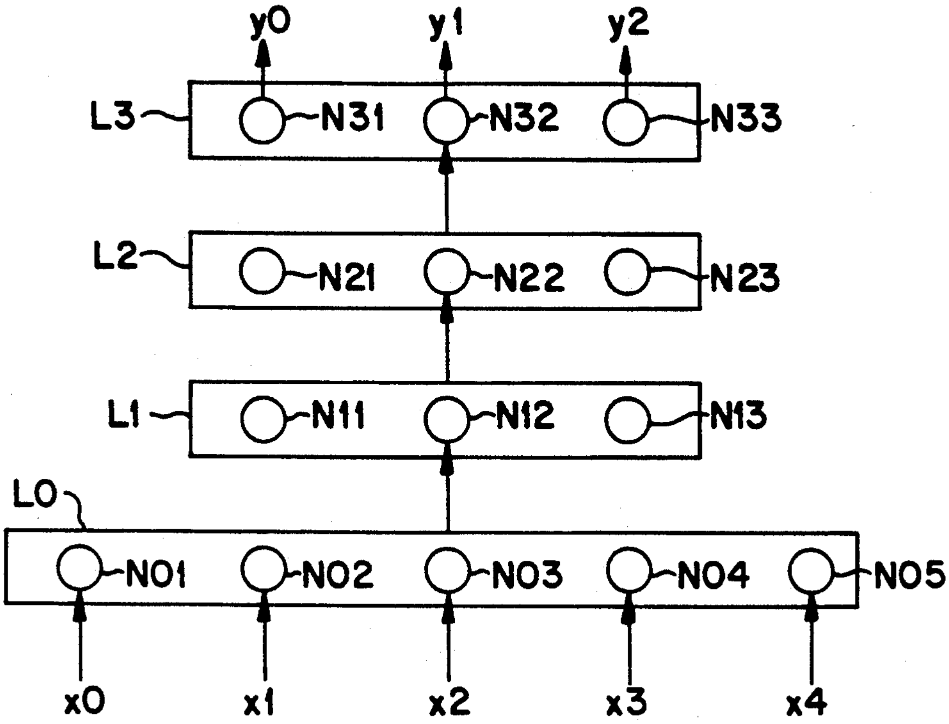
FIG. 1 is a concept diagram of a conventional multi-layer neural network.

FIG. 1 is a concept diagram of a general multi-layer neural network which is a feed forward network having nodes of at least one layer between input and output nodes. These additional layers include hidden units or nodes which are not directly connected to both the input and output nodes. As shown in FIG. 1, the three-layer neural network has two-layer hidden layers L1 and L2 between the input layer L0 and the output layer L3. The input layer L0 has five neuron units or nodes N01 to N05 to receive inputs $X_0$ to $X_4$. The hidden layers L1 and L2 each have three neuron units or nodes N11, N12, & N13, and N21, N22, & N23, respectively, while output layer L3 also has three neuron units or nodes N31, N32, and N33 to respectively generate outputs $Y_0$, $Y_1$, and $Y_2$. Here, it should be noted that the number of neuron units of each layer is determined by the number of input and output bits of the circuitry of the system. The neuron units or nodes of each layer are connected with all of the neuron units of its directly preceding lower layer only.

Figure 2:
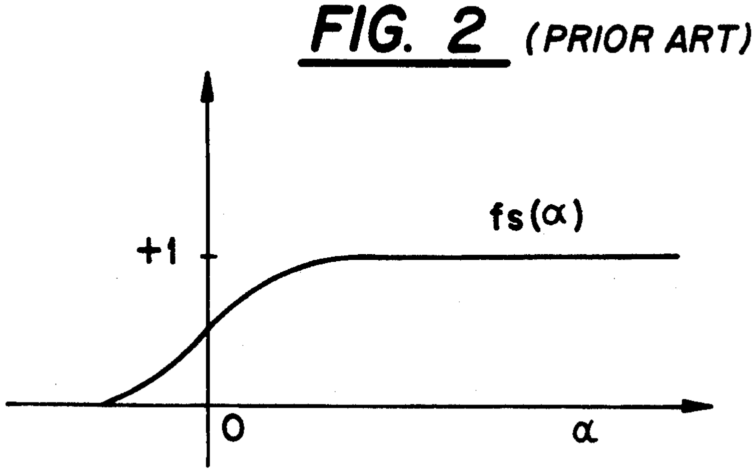
FIG. 2 is a characteristic graphic diagram of a sigmoid function used in the learning of the conventional multi-layer neural network.

The conventional multi-layer neural network is learned by the previously known back-propagation training algorithm (BPTA). The BPTA has the graphic characteristic shown in FIG. 2 and uses the sigmoid function represented in the following Eq. (I)

$$f(a) = \frac{1}{1 + \exp[-(a - \theta)]} \quad (I)$$

However, since the sigmoid function is an exponential function, the hardware implementation is difficult and complicated.

Also, when a binary input and a step function are used, the conventional multi-layer neural network may have just one value with respect to different input values because of the connection structure between layers. As a result, the upper layer input values cannot be discriminated.

FIG. 3 is a concept view of a multi-layer neural network according to the present invention. The present multi-layer neural network is different from the multi-layer neural network of FIG. 1 in that the neuron units or nodes of each layer are connected with all neuron units of the immediate input layer as well as those of its directly preceding lower layer. Since other parts of this constitution is the same as those of FIG. 1, the same reference numerals will be used for the corresponding parts. Also, the learning of the multi-layer neural network of the present invention has the graphic characteristic shown in FIG. 4 and uses the step function represented in the following Eq. (II):

$$Y_i = \frac{1}{2}\left[fh\left(\sum_{i=0}^{N-1} W_i \cdot X_i - \theta\right) + 1\right] \quad (II)$$

fh $(\Sigma W_i \cdot X_i - \theta)$: hard limit non-linear function $\theta$: threshold value of neuron node Wi: connection weight value with respect to Xi Xi: input The circuit of multi-layer neural network according to the present invention is designed by the learning algorithm as follows.

Step 1: All connection weight values between nodes are initialized.

Step 2: A pair of input and desired output are presented to input and output. Here, the inputs are m-bit binary values and the total number of inputs is $2^m$, and the outputs are n-bit binary values and the total number of outputs is $2^n$. Accordingly, identical output values with respect to different inputs can be obtained.

Step 3: The sum of the input weight values at each node is obtained and the actual output is generated by the step function. Here, Eq. (II) is used for the step function.

Step 4: The desired output value at an output node is compared with the actual output value obtained in step 3, thereby calculating an error, and the variation of the weight value according to the error is stored. That is, the error $\delta$ is:

$$\delta = \text{Desired Output} - \text{Actual Output}$$

and the weight value variation $\Delta W$ is $$\Delta W = \delta \times \text{Input}$$

Step 5: After steps 2, 3, and 4 are carried out for each input and output pair, if all the actual output values are equal to the desired output values, the learning ends. If not, the total sum of the weight value variation $\Delta W$ is added to each weight value. That is, the new weight value ($W_T$) is:

$$W_T = W_{T-1} + \Sigma\Delta W$$

where T equals the number of learnings.

Step 6: When the sum of the new weight value $W_T$ with respect to each node's input is above a determined value M, the weight values $W_T$ are reduced at a predetermined rate. That is, the weight value $W_T$ is reduced by the following equation:

$$W_T' = W_T \times \frac{M}{\Sigma W_T} \quad (III)$$

assuming, $\Sigma W_T > M$ and where $W_T'$ is the weight value obtained after the T learning processes have been conducted.

Step 7: If the preceding steps (from step 2) are repeated a predetermined number of times with a new weight value $W_T$ and without reaching the desired result, the current output layer becomes a hidden layer, the new output layer is incremented, and then the process is repeated (beginning at step 2) using the original input together with the output of the directly preceding hidden layers as a new input to the new output layer.

Hence, learning is performed by one-layer learning. If a desired output value is correctly obtained, learning ends. However, if learning is repeated a predetermined number of times, and the result remains incorrect, then a layer is added. In the incremented new layer, the original input and the incomplete actual output of directly following hidden layers are used as new inputs. Learning is then repeated for the following layer. At that point, an output layer associated with first learning step is changed to serve as a hidden layer. As a result, in the following layer, the subsequent learning step is repeated as in the learning step of the previous layer, but with more inputs by the number of outputs of the directly lower hidden layer. During the learning process, whenever an input is added, the variation in weight value is stored. After all inputs are applied, the sum of variations of the total weight values is added into the weight value, thereby making a new weight value.

Here, the sum of the weight value to be compared with one neuron is above the predetermined value M, Eq. (II) is applied with respect to each weight value to reduce them at a predetermined rate, thereby limiting the sum of the weight values to within the value M.

An embodiment of a multi-layer neuron network designed with respect to specific inputs and outputs through such a learning, is shown in FIG. 5A. As shown in FIG. 5A, the multi-layer neural network is embodied with CMOS inverters and PMOS and NMOS transistors. In FIG. 5A, a three-layer neuron network is shown having a 5-bit input and a 3-bit output. Thus, an input layer L0 has five neurons N01 to N05, and two hidden layers L1 and L2 each including three neurons N11, N12, & N13, and N21, N22, & N23, respectively. Similarly, output layer L3 also has three neurons N31, N32, and N33. Here, each neuron of every layer is a cascaded connection of a pair of CMOS inverters INT1 and INT2 as shown in FIG. 5B, and is constructed with a buffer where an output node of preceding CMOS inverter INT1 is an inverted output node NDB and the output node of following CMOS inverter INT2 is a non-inverted output node ND. The synapse for connecting each neuron of an input layer and each neuron of output layer is constructed of PMOS and NMOS transistors by the following method.

If the learning obtains a final connection weight which is positive, and the input neuron IN receives a high logic signal (input bit value=1), the corresponding connection strength in the form of a first supply voltage (e.g., supply voltage Vcc) is connected to the input node IND of the output neuron ON through the PMOS transistor B whose gate is common with the inverted output node NDB, and for negative connection weight values, the connection is to a second supply voltage (e.g., ground or Vss) through NMOS transistor C whose gate is common with the non-inverted output node ND. Conversely, when the input neuron receives a low (input bit value=0) and the connection weight is positive, the connection strength is in the form of supply voltage Vcc connected through PMOS transistor A whose gate is also common to the non-inverted output mode ND, while for negative weights, the connection strength is a ground potential or equals the second supply voltage Vss, and is connected through NMOS transistor D whose gate is tied to the inverted output node NDB.

If the connection weight value is "0", no connections are made, regardless of the logic state of the input bit.

Using this method, an input synapse group S1 and transfer synapse groups S2 and S3 of FIG. 5A are constructed of PMOS and NMOS transistors. Here, each neuron of input layer L0 is connected to each input node of every neuron of the two hidden layers L1 and L2 and output layer L3, through the aforesaid input synapse group S1 in a matrix. Each neuron of hidden layer L1 is connected to each input node of neuron of its directly following hidden layer L2 through the transfer synapse group S2 of the matrix. Similarly, each neuron of hidden layer L2 is connected to each input node of the neurons of output layer L3, through the transfer synapse group S3 in a matrix.

Also, all neuron input nodes of the two hidden layers L1 and L2 and output layer L3 shown in FIG. 5A are biased to the second supply voltage Vss or GND through each bias synapse group S4. Since the bias synapse group S4 biases the input node of each neuron to the second supply voltage Vss or GND when the input is not applied and thus biases each neuron output to "0", the bias synapse group S4 is composed of NMOS transistor, wherein the first supply voltage Vcc is supplied to the gate, the drain is connected to input node of each neuron, and the second supply voltage (Vss or GND) is connected to the source. Here, the NMOS transistor for a bias synapse has the geometric aspect ratio (channel width (W)/ channel length (L)) to have a connection strength equivalent to the unit weight value. For instance, when the W/L ratio of NMOS transistor is 2 μm/2 μm as a unit weight value, the W/L ratio of the PMOS transistor becomes 5 μm/2 μm. This is set considering the mobility ratio of electron to hole, and each weight value is a multiple of the unit weight value; that number being an integer. Thus, the term of "+1" in Eq. (II) is a constant considering the bias synapse value.

The embodiment applying the multi-layer neural network of the present invention as described above to the 2-bit full adder and the sine wave generating circuit is as follows.

Embodiment I 2-bit Full Adder

When the maximum value M of the sum of weight values of each node is 20 and 40, and the learning number is 300 and 500, the number of layers are as shown in Table 1 and the result is shown in List 1.

TABLE 1

| | learning number | |
|---|---|---|
| M | 300 | 500 |
| 20 | 4 | 4 |
| 40 | 3 | 3 |

Input file name is "a"
Connection type is 2
Max. weight sum=20
Number of learnings=300
Initial weight value=0
Max. weight is used
Displayed percent is a variable unit
Delta weight is uninitialized

| input/output | |
|---|---|
| 00000 | 000 |
| 00001 | 001 |
| 00010 | 001 |
| 00011 | 010 |
| 00100 | 010 |
| 00101 | 011 |
| 00110 | 011 |
| 00111 | 100 |
| 01000 | 001 |
| 01001 | 010 |
| 01010 | 010 |
| 01011 | 011 |
| 01100 | 011 |
| 01101 | 100 |
| 01110 | 100 |
| 01111 | 101 |
| 10000 | 010 |
| 10001 | 011 |
| 10010 | 011 |
| 10011 | 100 |
| 10100 | 100 |
| 10101 | 101 |
| 10110 | 101 |
| 10111 | 110 |
| 11000 | 110 |
| 11001 | 100 |
| 11010 | 100 |
| 11011 | 101 |
| 11100 | 101 |
| 11101 | 110 |
| 11110 | 110 |
| 11111 | 111 |

(Error percentage)

3% 3% 15% 18% 25% 25% 21% 25% 25% 25% 25% 21% 28%
25% 21% 21% 25% 21% 21% 28% 28% 25% 25% 21% 21% 25%
25% 21% 25% 25% 21% 28% 28% 25% 21% 21% 21% 25% 25%
21% 28% 25% 21% 21% 28% 25% 21% 21% 25% 21% 21% 28%
28% 25% 25% 21% 21% 25% 25% 21% 25% 25% 21% 28% 28%
25% 21% 21% 21% 25% 25% 21% 28% 25% 21% 21% 28% 25%
21% 21% 25% 21% 21% 28% 28% 25% 25% 21% 21% 25% 25%
21% 25% 25% 21% 28% 28% 25% 21% 21% 21% 25% 25% 21%
28% 25% 21% 21% 28% 25% 21% 21% 25% 21% 21% 28% 28%
25% 25% 21% 21% 25% 25% 21% 25% 25% 21% 28% 28% 25%
21% 21% 21% 25% 25% 21% 28% 25% 21% 21% 28% 25% 21%
21% 25% 21% 21% 28% 28% 25% 25% 21% 21% 25% 25% 21%
25% 25% 21% 28% 28% 25% 21% 21% 21% 25% 25% 21% 28%
25% 21% 21% 28% 25% 21% 21% 25% 21% 21% 28% 28% 25%
25% 21% 21% 25% 25% 21% 25% 25% 21% 28% 28% 25% 21%
21% 21% 25% 25% 21% 28% 25% 21% 21% 28% 25% 21% 21%
25% 21% 21% 28% 28% 25% 25% 21% 21% 25% 25% 21% 25%
25% 21% 28% 28% 25% 21% 21% 21% 25% 25% 21% 28% 25%
21% 21% 28% 25% 21% 21% 25% 21% 21% 28% 28% 25% 25%
21% 21% 25% 25% 21% 25% 25% 21% 28% 28% 25% 21% 21%
21% 25% 25% 21% 28% 25% 21% 21% 28% 25% 21% 21% 25%
21% 21% 28% 28% 25% 25% 21% 21% 25% 25% 21% 25% 25%
21% 28% 28% 25% 21% 21% 21% 25% 25% 21% 28% 25% 21%
21% 28%

| h_value (actual output) |
|---|
| 011 |
| 011 |
| 011 |
| 011 |
| 011 |
| 011 |
| 011 |
| 111 |
| 010 |
| 011 |
| 011 |
| 011 |
| 011 |
| 111 |
| 111 |
| 111 |
| 010 |
| 011 |
| 011 |
| 111 |
| 111 |

-continued

| |
|---|
| 111 |
| 111 |
| 111 |
| 110 |
| 110 |
| 110 |
| 111 |
| 110 |
| 111 |
| 111 |
| 111 |

layer number = 0

| | | | | | |
|---|---|---|---|---|---|
| 5 | 3 | 4 | 3 | 3 | INPUT "1" |
| 4 | 4 | 4 | 4 | 4 | |
| −1 | −1 | 5 | 5 | 5 | |

weight 2

| | | | | | |
|---|---|---|---|---|---|
| −8 | −2 | −6 | −1 | −1 | INPUT "0" |
| 4 | 4 | 4 | 4 | 4 | |
| 6 | 6 | −2 | −2 | −2 | |

| new input |
|---|
| 00000011 |
| 00001011 |
| 00010011 |
| 00011011 |
| 00100011 |
| 00101011 |
| 00110011 |
| 00111111 |
| 01000010 |
| 01001011 |
| 01010011 |
| 01011011 |
| 01100011 |
| 01101111 |
| 01110111 |
| 01111111 |
| 10000010 |
| 10001011 |
| 10010011 |
| 10011111 |
| 10100111 |
| 10101111 |
| 10110111 |
| 10111111 |
| 11000110 |
| 11001110 |
| 11010110 |
| 11011111 |
| 11100110 |
| 11101111 |
| 11110111 |
| 11111111 |

3% 3% 25% 25% 25% 21% 37% 28% 31% 37% 43% 59% 46%
46% 46% 28% 31% 34% 50% 53% 46% 43% 50% 71% 43% 31%
50% 46% 46% 59% 53% 50% 68% 46% 46% 53% 40% 25% 34%
46% 46% 56% 56% 40% 43% 53% 37% 28% 59% 59% 46% 53%
56% 28% 28% 21% 28% 25% 40% 59% 53% 65% 34% 28% 46%
59% 53% 53% 62% 46% 50% 59% 59% 43% 40% 68% 59% 62%
59% 46% 50% 62% 59% 50% 50% 65% 56% 46% 56% 46% 46%
59% 50% 46% 68% 59% 65% 46% 40% 43% 59% 50% 50% 56%
56% 59% 50% 50% 68% 50% 59% 62% 50% 34% 25% 40% 50%
59% 62% 71% 56% 53% 53% 46% 40% 37% 59% 50% 34% 56%
59% 56% 28% 21% 34% 46% 62% 46% 50% 53% 50% 46% 46%
46% 46% 46% 50% 53% 59% 53% 50% 50% 65% 50% 40% 50%
59% 62% 59% 46% 50% 65% 59% 59% 34% 28% 25% 43% 50%
56% 62% 50% 53% 65% 46% 46% 62% 59% 50% 53% 56% 43%
31% 21% 50% 59% 56% 46% 34% 34% 40% 31% 43% 34% 68%
50% 53% 59% 46% 53% 50% 62% 46% 53% 62% 59% 65% 43%
43% 43% 50% 65% 62% 59% 68% 43% 50% 50% 53% 68% 25%
28% 43% 71% 68% 71% 56% 50% 53% 56% 62% 62% 59% 68%
62% 53% 46% 34% 46% 53% 46% 53% 59% 62% 46% 59% 59%
53% 50% 31% 25% 53% 53% 50% 31% 28% 31% 43% 53% 62%
56% 56% 31% 50% 46% 43% 46% 59% 68% 65% 56% 50% 43%
43% 56% 46% 40% 56% 65% 31% 28% 31% 46% 46% 59% 62%
50% 50% 43% 46% 62% 46% 50% 65% 46% 50% 59% 59% 68%
50% 53%

| h_value |
|---|
| 000 |

-continued

| |
|---|
| 0 1 0 |
| 0 1 0 |
| 0 1 0 |
| 0 1 0 |
| 0 1 1 |
| 0 1 1 |
| 1 0 0 |
| 0 1 0 |
| 0 1 0 |
| 0 1 0 |
| 0 1 1 |
| 0 1 1 |
| 1 0 0 |
| 1 0 0 |
| 1 1 0 |
| 0 1 0 |
| 0 1 1 |
| 0 1 1 |
| 1 0 0 |
| 1 0 0 |
| 1 1 0 |
| 1 1 0 |
| 1 1 0 |
| 1 0 0 |
| 1 0 0 |
| 1 0 0 |
| 1 1 0 |
| 1 1 0 |
| 1 1 0 |
| 1 1 0 |
| 1 1 1 |

| layer number = 1 |
|---|
| 4 2 3 2 2 3 0 0 |
| 3 2 2 1 1 −5 1 2 |
| 2 1 3 1 1 −6 1 −1 |

| weight 2 |
|---|
| −5 −2 −3 −1 −1 −5 0 0 |
| −4 −2 −2 −1 −1 6 0 0 |
| −2 −2 −3 −2 −2 4 0 1 |

| new point |
|---|
| 0 0 0 0 0 0 0 0 |
| 0 0 0 0 1 0 1 0 |
| 0 0 0 1 0 0 1 0 |
| 0 0 0 1 1 0 1 0 |
| 0 0 1 0 0 0 1 0 |
| 0 0 1 0 1 0 1 1 |
| 0 0 1 1 0 0 1 1 |
| 0 0 1 1 1 1 0 0 |
| 0 1 0 0 0 0 1 0 |
| 0 1 0 0 1 0 1 0 |
| 0 1 0 1 0 0 1 0 |
| 0 1 0 1 1 0 1 1 |
| 0 1 1 0 0 0 1 1 |
| 0 1 1 0 1 1 0 0 |
| 0 1 1 1 0 1 0 0 |
| 0 1 1 1 1 1 1 0 |
| 1 0 0 0 0 0 1 0 |
| 1 0 0 0 1 0 1 1 |
| 1 0 0 1 0 0 1 1 |
| 1 0 0 1 1 1 0 0 |
| 1 0 1 0 0 1 0 0 |
| 1 0 1 0 1 1 1 0 |
| 1 0 1 1 0 1 1 0 |
| 1 0 1 1 1 1 1 0 |
| 1 1 0 0 0 1 0 0 |
| 1 1 0 0 1 1 0 0 |
| 1 1 0 1 0 1 0 0 |
| 1 1 0 1 1 1 1 0 |
| 1 1 1 0 0 1 1 0 |
| 1 1 1 0 1 1 1 0 |
| 1 1 1 1 0 1 1 0 |
| 1 1 1 1 1 1 1 1 |

3% 25% 46% 56% 46% 56% 62% 62% 56% 50% 50% 59% 62% 65% 56% 62% 71% 56% 71% 65% 56% 40% 62% 56% 71% 71% 62% 71% 56% 62% 71% 62% 71% 68% 56% 56% 71% 56% 71% 71% 68% 59% 71% 71% 59% 62% 68% 68% 43% 65% 62% 50% 71% 65% 71% 56% 71% 68% 56% 68% 71% 71% 71% 59% 71% 65% 78% 71% 56% 71% 59% 50% 68% 62% 53% 25% 46% 71% 68% 81% 65% 59% 68% 56% 71% 71% 68% 71% 71% 56% 71%

-continued

78% 75% 71% 65% 71% 34% 31% 65% 71% 68% 68% 59% 59% 78% 71% 40% 56% 68% 71% 71% 46% 25% 56% 71% 68% 65% 71% 71% 71% 68% 62% 78% 59% 71% 68% 56% 68% 71% 59% 46% 65% 71% 65% 71% 56% 71% 65% 65% 78% 68% 71% 65% 68% 68% 65% 56% 71% 71% 71% 65% 71% 71% 71% 81% 81% 71% 84% 87% 84% 96% 81% 62% 75% 90% 90% 84% 87% 93% 71% 96% 87% 96% 96% 71% 96% 87% 96% 93% 78% 87% 93% 84% 96% 87% 59% 84% 87% 90% 84% 87% 93% 71% 96% 87% 96% 96% 71% 96% 87% 96% 93% 78% 87% 93% 84% 96% 87% 59% 84% 87% 90% 84% 87% 93% 71% 96% 87% 96% 96% 71% 96% 87% 96% 93% 78% 87% 93% 84% 96% 87% 59% 84% 87% 90% 84% 87% 93% 71% 96% 87% 96% 96% 71% 96% 87% 96% 93% 78% 87% 93% 78% 87% 93% 84% 96% 87% 59% 84% 87% 90% 84% 87% 93% 71% 96% 87% 96% 96% 71% 96% 87% 96% 93% 78% 87% 93% 84% 96% 87% 59% 84% 87% 90% 84% 87% 93% 71% 96% 87% 96% 96% 71% 96% 87% 96% 93% 78% 87% 93% 84% 96% 87% 59%

| h_value |
|---|
| 0 0 0 |
| 0 0 1 |
| 0 0 1 |
| 0 1 0 |
| 0 1 0 |
| 0 1 1 |
| 0 1 1 |
| 1 0 0 |
| 0 0 1 |
| 0 1 0 |
| 0 1 0 |
| 0 1 1 |
| 0 1 1 |
| 1 0 0 |
| 1 0 0 |
| 1 0 1 |
| 0 1 0 |
| 0 1 1 |
| 0 1 1 |
| 1 0 0 |
| 1 0 0 |
| 1 0 1 |
| 1 0 1 |
| 1 1 0 |
| 1 0 0 |
| 1 0 0 |
| 1 0 0 |
| 1 0 1 |
| 1 0 1 |
| 1 1 0 |
| 1 1 0 |
| 1 1 1 |

| layer number = 2 |
|---|
| 4 2 3 1 1 3 −2 −1 |
| 3 1 2 1 1 −5 −1 1 |
| −2 −1 −2 −1 −1 4 3 3 |

| weight 2 |
|---|
| −4 −2 −3 −1 −1 −4 0 −1 |
| −3 −1 −2 −1 −1 5 2 0 |
| 2 1 2 1 1 −4 −3 −3 |

| new point |
|---|
| 0 0 0 0 0 0 0 0 |
| 0 0 0 0 1 0 0 1 |
| 0 0 0 1 0 0 0 1 |
| 0 0 0 1 1 0 1 0 |
| 0 0 1 0 0 0 1 0 |
| 0 0 1 0 1 0 1 1 |
| 0 0 1 1 0 0 1 1 |
| 0 0 1 1 1 1 0 0 |
| 0 1 0 0 0 0 0 1 |
| 0 1 0 0 1 0 1 0 |
| 0 1 0 1 0 0 1 0 |
| 0 1 0 1 1 0 1 1 |
| 0 1 1 0 0 0 1 1 |
| 0 1 1 0 1 1 0 0 |
| 0 1 1 1 0 1 0 0 |
| 0 1 1 1 1 1 0 1 |
| 1 0 0 0 0 0 1 0 |
| 1 0 0 0 1 0 1 1 |
| 1 0 0 1 0 0 1 1 |

-continued 1 0 0 1 1 1 0 0
1 0 1 0 0 1 0 0
1 0 1 0 1 1 0 1
1 0 1 1 0 1 0 1
1 0 1 1 1 1 1 0
1 1 0 0 0 1 0 0
1 1 0 0 1 1 0 0
1 1 0 1 0 1 0 0
1 1 0 1 1 1 0 1
1 1 1 0 0 1 0 1
1 1 1 0 1 1 1 0
1 1 1 1 0 1 1 0
1 1 1 1 1 1 1 1
3% 15% 78% 90% 90% 90% 81% 87% 96% 87% 96% 96% 87%
87% 96% 96% 96% 90% 90% 96% 96% 87% 96% 96% 90% 96%
87% 96% 96% 87% 87% 96% 96% 96% 87% 96% 96% 81% 78%
96% 96% 87% 96% 96% 81% 96% 96% 96% 96% 90% 90% 96%
84% 90% 90% 84% 96% 96% 96% 96% 81% 90% 96% 96% 96%
87% 96% 96% 96% 93% 96% 96% 90% 96% 96% 93% 96% 96%
93% 96% 96% 96% 81% 96% 96% 96% 96% 87% 96% 96% 96%
93% 96% 96% 93% 96% 96% 93% 96% 93% 96% 96% 93% 96%
96% 93% 96% 96% 87% 96% 96% 90% 90% 96% 84% 96% 96%
96% 96% 93% 81% 84% 96% 96% 96% 96% 87% 96% 96% 96%
96% 84% 96% 96% 96% 96% 90% 96% 87% 90% 96% 96% 93%
96% 96% 100% h_value 0 0 0
0 0 1
0 0 1
0 1 0
0 1 0
0 1 1
0 1 1
1 0 0
0 0 1
0 1 0
0 1 0
0 1 1
0 1 1
1 0 0
1 0 0
1 0 1
0 1 0
0 1 1
0 1 1
1 0 0
1 0 0
1 0 1
1 1 0
1 1 0
1 0 0
1 0 0
1 0 1
1 0 1
1 1 0

-continued 1 1 0
1 1 1 layer number = 3

3 1 2 0 0 4 −4 −2
4 1 1 −1 −1 −4 3 −1
−2 −1 −1 −1 −1 3 3 5 weight 2

−3 −2 −3 −2 −2 −4 0 −1
−4 −2 −1 0 0 5 −2 2
2 1 1 1 1 −3 −3 −5 recall 0 0 0
0 0 1
0 0 1
0 1 0
0 1 0
0 1 1
0 1 1
1 0 0
0 0 1
0 1 0
0 1 0
0 1 1
0 1 1
1 0 0
1 0 0
1 0 1
0 1 0
0 1 1
0 1 1
1 0 0
1 0 0
1 0 1
1 0 1
1 1 0
1 1 0
1 0 0
1 0 0
1 0 1
1 0 1
1 1 0
1 1 0
1 1 1

Input file name is "a"
Connection type is 2
Max. weight sum=20
Number of learnings=500
Initial weight value=0
Max. weight is used
Displayed percent is a variable unit
Delta weight is uninitialized

| | |
|---|---|
| 0 0 0 0 0 | 0 0 0 |
| 0 0 0 0 1 | 0 0 1 |
| 0 0 0 1 0 | 0 0 1 |
| 0 0 0 1 1 | 0 1 0 |
| 0 0 1 0 0 | 0 1 0 |
| 0 0 1 0 1 | 0 1 1 |
| 0 0 1 1 0 | 0 1 1 |
| 0 0 1 1 1 | 1 0 0 |
| 0 1 0 0 0 | 0 0 1 |
| 0 1 0 0 1 | 0 1 0 |
| 0 1 0 1 0 | 0 1 0 |
| 0 1 0 1 1 | 0 1 1 |
| 0 1 1 0 0 | 0 1 1 |
| 0 1 1 0 1 | 1 0 0 |
| 0 1 1 1 0 | 1 0 0 |
| 0 1 1 1 1 | 1 0 1 |
| 1 0 0 0 0 | 0 1 0 |
| 1 0 0 0 1 | 0 1 1 |
| 1 0 0 1 0 | 0 1 1 |
| 1 0 0 1 1 | 1 0 0 |
| 1 0 1 0 0 | 1 0 0 |
| 1 0 1 0 1 | 1 0 1 |

-continued

| | |
|---|---|
| 1 0 1 1 0 | 1 0 1 |
| 1 0 1 1 1 | 1 1 0 |
| 1 1 0 0 0 | 1 1 0 |
| 1 1 0 0 1 | 1 0 0 |
| 1 1 0 1 0 | 1 0 0 |
| 1 1 0 1 1 | 1 0 1 |
| 1 1 1 0 0 | 1 0 1 |
| 1 1 1 0 1 | 1 1 0 |
| 1 1 1 1 0 | 1 1 0 |
| 1 1 1 1 1 | 1 1 1 |

| | | | | | | | | | | | | |
|---|---|---|---|---|---|---|---|---|---|---|---|---|
| 3% | 3% | 15% | 18% | 25% | 25% | 21% | 25% | 25% | 25% | 25% | 21% | 28% |
| 25% | 21% | 21% | 25% | 21% | 21% | 28% | 28% | 25% | 25% | 21% | 21% | 25% |
| 25% | 21% | 25% | 25% | 21% | 28% | 28% | 25% | 21% | 21% | 21% | 25% | 25% |
| 21% | 28% | 25% | 21% | 21% | 28% | 25% | 21% | 21% | 25% | 21% | 21% | 28% |
| 28% | 25% | 25% | 21% | 21% | 25% | 25% | 21% | 25% | 25% | 21% | 28% | 28% |
| 25% | 21% | 21% | 21% | 25% | 25% | 21% | 28% | 25% | 21% | 21% | 28% | 25% |
| 21% | 21% | 25% | 21% | 21% | 28% | 28% | 25% | 25% | 21% | 21% | 25% | 25% |
| 21% | 25% | 25% | 21% | 28% | 28% | 25% | 21% | 21% | 21% | 25% | 25% | 21% |
| 28% | 25% | 21% | 21% | 28% | 25% | 21% | 21% | 25% | 21% | 21% | 28% | 28% |
| 25% | 25% | 21% | 21% | 25% | 25% | 21% | 25% | 25% | 21% | 28% | 28% | 25% |
| 21% | 21% | 21% | 25% | 25% | 21% | 28% | 25% | 21% | 21% | 28% | 25% | 21% |
| 21% | 25% | 21% | 21% | 28% | 28% | 25% | 25% | 21% | 21% | 25% | 25% | 21% |
| 25% | 25% | 21% | 28% | 28% | 25% | 21% | 21% | 21% | 25% | 25% | 21% | 28% |
| 25% | 21% | 21% | 28% | 25% | 21% | 21% | 25% | 21% | 21% | 28% | 28% | 25% |
| 25% | 21% | 21% | 25% | 25% | 21% | 25% | 25% | 21% | 28% | 28% | 25% | 21% |
| 21% | 21% | 25% | 25% | 21% | 28% | 25% | 21% | 21% | 28% | 25% | 21% | 21% |
| 25% | 21% | 21% | 28% | 28% | 25% | 25% | 21% | 21% | 25% | 25% | 21% | 25% |
| 25% | 21% | 28% | 28% | 25% | 21% | 21% | 21% | 25% | 25% | 21% | 28% | 25% |
| 21% | 21% | 28% | 25% | 21% | 21% | 25% | 21% | 21% | 28% | 28% | 25% | 25% |
| 21% | 21% | 25% | 25% | 21% | 25% | 25% | 21% | 28% | 28% | 25% | 21% | 21% |
| 21% | 25% | 25% | 21% | 28% | 25% | 21% | 21% | 28% | 25% | 21% | 21% | 25% |
| 21% | 21% | 28% | 28% | 25% | 25% | 21% | 21% | 25% | 25% | 21% | 25% | 25% |
| 21% | 28% | 28% | 25% | 21% | 21% | 21% | 25% | 25% | 21% | 28% | 25% | 21% |
| 21% | 28% | 25% | 21% | 21% | 25% | 21% | 21% | 28% | 28% | 25% | 25% | 21% |
| 21% | 25% | 25% | 21% | 25% | 25% | 21% | 28% | 28% | 25% | 21% | 21% | 21% |
| 25% | 25% | 21% | 28% | 25% | 21% | 21% | 28% | 25% | 21% | 21% | 25% | 21% |
| 21% | 28% | 28% | 25% | 25% | 21% | 21% | 25% | 25% | 21% | 25% | 25% | 21% |
| 28% | 28% | 25% | 21% | 21% | 21% | 25% | 25% | 21% | 28% | 25% | 21% | 21% |
| 28% | 25% | 21% | 21% | 25% | 21% | 21% | 28% | 28% | 25% | 25% | 21% | 21% |
| 25% | 25% | 21% | 25% | 25% | 21% | 28% | 28% | 25% | 21% | 21% | 21% | 25% |
| 25% | 21% | 28% | 25% | 21% | 21% | 28% | 25% | 21% | 21% | 25% | 21% | 21% |
| 28% | 28% | 25% | 25% | 21% | 21% | 25% | 25% | 21% | 25% | 25% | 21% | 28% |
| 28% | 25% | 21% | 21% | 21% | 25% | 25% | 21% | 28% | 25% | 21% | 21% | 28% |
| 25% | 21% | 21% | 25% | 21% | 21% | 28% | 28% | 25% | 25% | 21% | 21% | 25% |
| 25% | 21% | 25% | 25% | 21% | 28% | 28% | 25% | 21% | 21% | 21% | 25% | 25% |
| 21% | 28% | 25% | 21% | 21% | 28% | 25% | 21% | 21% | 25% | 21% | 21% | 28% |
| 28% | 25% | 25% | 21% | 21% | 25% | 25% | 21% | 25% | 25% | 21% | 28% | 28% |
| 25% | 21% | 21% | 21% | 25% | 25% | 21% | 28% | 25% | 21% | 21% | 28% | 25% |
| 21% | 21% | 25% | 21% | 21% | 28% | 28% | | | | | | |

| h_value |
|---|
| 0 1 1 |
| 0 1 1 |
| 0 1 1 |
| 0 1 1 |
| 0 1 1 |
| 0 1 1 |
| 0 1 1 |
| 1 1 1 |
| 0 1 0 |
| 0 1 1 |
| 0 1 1 |
| 0 1 1 |
| 0 1 1 |
| 1 1 1 |
| 1 1 1 |
| 1 1 1 |
| 0 1 0 |
| 0 1 1 |
| 0 1 1 |
| 1 1 1 |
| 1 1 1 |
| 1 1 1 |
| 1 1 1 |
| 1 1 1 |
| 1 1 0 |
| 1 1 0 |
| 1 1 0 |
| 1 1 1 |
| 1 1 0 |
| 1 1 1 |
| 1 1 1 |
| 1 1 1 |

-continued layer number = 0

| | | | | |
|---|---|---|---|---|
| 5 | 3 | 4 | 3 | 3 |
| 4 | 4 | 4 | 4 | 4 |
| −2 | −2 | 4 | 4 | 4 |

weight 2

| | | | | |
|---|---|---|---|---|
| −8 | −2 | −6 | −1 | −1 |
| 4 | 4 | 4 | 4 | 4 |
| 5 | 5 | −2 | −2 | −2 |

new input 0 0 0 0 0 0 1 1
0 0 0 0 1 0 1 1
0 0 0 1 0 0 1 1
0 0 0 1 1 0 1 1
0 0 1 0 0 0 1 1
0 0 1 0 1 0 1 1
0 0 1 1 0 0 1 1
0 0 1 1 1 1 1 1
0 1 0 0 0 0 1 0
0 1 0 0 1 0 1 1
0 1 0 1 0 0 1 1
0 1 0 1 1 0 1 1
0 1 1 0 0 0 1 1
0 1 1 0 1 1 1 1
0 1 1 1 0 1 1 1
0 1 1 1 1 1 1 1
1 0 0 0 0 0 1 0
1 0 0 0 1 0 1 1
1 0 0 1 0 0 1 1
1 0 0 1 1 1 1 1
1 0 1 0 0 1 1 1
1 0 1 0 1 1 1 1
1 0 1 1 0 1 1 1
1 0 1 1 1 1 1 1
1 1 0 0 0 1 1 0
1 1 0 0 1 1 1 0
1 1 0 1 0 1 1 0
1 1 0 1 1 1 1 1
1 1 1 0 0 1 1 0
1 1 1 0 1 1 1 1
1 1 1 1 0 1 1 1
1 1 1 1 1 1 1 1

| | | | | | | | | | | | | |
|---|---|---|---|---|---|---|---|---|---|---|---|---|
| 3% | 3% | 25% | 21% | 25% | 25% | 37% | 25% | 31% | 37% | 43% | 46% | 40% |
| 46% | 40% | 37% | 25% | 25% | 37% | 37% | 56% | 59% | 62% | 71% | 56% | 34% |
| 50% | 59% | 34% | 50% | 56% | 65% | 28% | 31% | 31% | 46% | 46% | 37% | 34% |
| 31% | 43% | 46% | 50% | 43% | 65% | 40% | 31% | 25% | 31% | 40% | 56% | 53% |
| 62% | 37% | 28% | 21% | 25% | 28% | 56% | 62% | 56% | 50% | 50% | 50% | 65% |
| 46% | 68% | 71% | 56% | 46% | 40% | 56% | 43% | 37% | 34% | 40% | 46% | 50% |
| 46% | 46% | 46% | 50% | 56% | 65% | 50% | 50% | 46% | 43% | 59% | 59% | 65% |
| 62% | 62% | 37% | 43% | 56% | 53% | 59% | 46% | 34% | 65% | 53% | 56% | 28% |
| 28% | 56% | 59% | 53% | 50% | 62% | 56% | 46% | 46% | 65% | 46% | 46% | 56% |
| 37% | 46% | 59% | 53% | 62% | 53% | 46% | 68% | 59% | 56% | 56% | 28% | 25% |
| 25% | 50% | 40% | 37% | 65% | 56% | 46% | 59% | 56% | 46% | 53% | 53% | 53% |
| 50% | 62% | 50% | 46% | 68% | 65% | 53% | 50% | 65% | 59% | 46% | 28% | 28% |
| 53% | 50% | 56% | 65% | 62% | 62% | 46% | 43% | 53% | 62% | 46% | 56% | 62% |
| 68% | 53% | 50% | 40% | 43% | 43% | 56% | 59% | 50% | 59% | 65% | 53% | 43% |
| 59% | 68% | 37% | 43% | 65% | 53% | 43% | 28% | 40% | 46% | 46% | 37% | 50% |
| 37% | 43% | 62% | 68% | 53% | 50% | 62% | 50% | 53% | 40% | 50% | 68% | 59% |
| 59% | 65% | 46% | 46% | 62% | 59% | 31% | 28% | 46% | 53% | 40% | 50% | 56% |
| 59% | 62% | 56% | 28% | 21% | 50% | 53% | 53% | 46% | 43% | 37% | 43% | 31% |
| 34% | 28% | 50% | 65% | 62% | 28% | 40% | 59% | 50% | 59% | 68% | 53% | 43% |
| 46% | 25% | 28% | 40% | 62% | 53% | 50% | 31% | 28% | 31% | 56% | 59% | 46% |
| 53% | 59% | 62% | 50% | 56% | 65% | 31% | 43% | 46% | 50% | 65% | 65% | 62% |
| 59% | 37% | 34% | 25% | 43% | 65% | 62% | 53% | 56% | 53% | 50% | 59% | 43% |
| 25% | 53% | 59% | 50% | 65% | 56% | 68% | 53% | 43% | 31% | 46% | 59% | 65% |
| 46% | 43% | 46% | 65% | 50% | 46% | 50% | 34% | 31% | 40% | 62% | 68% | 62% |
| 53% | 68% | 65% | 50% | 50% | 65% | 53% | 46% | 46% | 50% | 65% | 53% | 62% |
| 65% | 62% | 65% | 62% | 40% | 37% | 50% | 68% | 53% | 53% | 50% | 50% | 59% |
| 46% | 46% | 65% | 50% | 50% | 65% | 62% | 50% | 53% | 56% | 53% | 50% | 59% |
| 59% | 46% | 50% | 56% | 56% | 53% | 50% | 50% | 46% | 59% | 65% | 71% | 56% |
| 34% | 25% | 62% | 68% | 65% | 62% | 46% | 46% | 50% | 68% | 53% | 53% | 59% |
| 59% | 50% | 53% | 46% | 28% | 40% | 50% | 62% | 53% | 53% | 40% | 50% | 50% |
| 43% | 53% | 31% | 43% | 65% | 65% | 50% | 50% | 53% | 59% | 68% | 50% | 34% |
| 50% | 25% | 34% | 65% | 50% | 56% | 71% | 50% | 43% | 50% | 56% | 62% | 62% |
| 65% | 68% | 62% | 68% | 53% | 50% | 50% | 43% | 37% | 56% | 59% | 46% | 59% |
| 50% | 46% | 68% | 68% | 46% | 31% | 25% | 56% | 62% | 68% | 50% | 46% | 40% |
| 46% | 56% | 62% | 46% | 62% | 65% | 65% | 50% | 56% | 56% | 43% | 56% | 56% |
| 59% | 50% | 56% | 37% | 31% | 50% | 62% | 62% | 53% | 50% | 56% | 56% | 68% |
| 56% | 50% | 31% | 31% | 46% | 59% | 53% | 43% | 62% | 53% | 50% | 53% | 56% |
| 62% | 59% | 46% | 28% | 25% | 50% | 68% | 56% | 50% | 56% | 31% | 43% | 65% |
| 56% | 59% | 43% | 50% | 53% | 31% | 28% | | | | | | |

h_value 0 0 0

-continued 010
010
010
010
011
011
100
010
010
010
011
011
100
100
100
010
011
011
100
100
110
110
110
100
100
100
110
110
110
110
111 layer number = 1

| | | | | | | | |
|---|---|---|---|---|---|---|---|
| 4 | 2 | 3 | 2 | 2 | 3 | 0 | 0 |
| 4 | 2 | 2 | 1 | 1 | −6 | 1 | 2 |
| 2 | 1 | 3 | 1 | 1 | −6 | 0 | −1 |

weight 2

| | | | | | | | |
|---|---|---|---|---|---|---|---|
| −5 | −2 | −3 | −1 | −1 | −5 | 0 | 0 |
| −4 | −2 | −2 | −1 | −1 | 5 | 0 | 0 |
| −3 | −2 | −3 | −2 | −2 | 5 | 0 | 1 |

00000000
00001010
00010010
00011010
00100010
00101011
00110011
00111100
01000010
01001010
01010010
01011011
01100011
01101100
01110100
01111100
10000010
10001011
10010011
10011100
10100100
10101110
10110110
10111110
11000100
11001100
11010100
11011110
11100110
11101110
11110110
11111111

| | | | | | | | | | | | | |
|---|---|---|---|---|---|---|---|---|---|---|---|---|
| 3% | 37% | 53% | 53% | 56% | 50% | 50% | 50% | 62% | 62% | 46% | 50% | 53% |
| 71% | 53% | 62% | 71% | 68% | 71% | 43% | 50% | 53% | 65% | 62% | 43% | 71% |
| 56% | 37% | 62% | 65% | 59% | 59% | 34% | 50% | 62% | 65% | 62% | 53% | 43% |
| 43% | 56% | 59% | 71% | 43% | 65% | 71% | 37% | 59% | 59% | 62% | 65% | 65% |
| 65% | 68% | 68% | 50% | 59% | 65% | 46% | 65% | 53% | 53% | 65% | 68% | 71% |
| 40% | 59% | 71% | 68% | 56% | 50% | 65% | 71% | 59% | 65% | 65% | 68% | 71% |
| 59% | 68% | 65% | 59% | 65% | 78% | 68% | 68% | 68% | 56% | 40% | 59% | 53% |
| 62% | 40% | 65% | 71% | 56% | 56% | 31% | 50% | 59% | 75% | 71% | 65% | 65% |
| 71% | 71% | 56% | 46% | 65% | 84% | 68% | 65% | 46% | 50% | 50% | 78% | 65% |
| 56% | 37% | 62% | 81% | 68% | 62% | 28% | 43% | 62% | 65% | 75% | 71% | 46% |
| 71% | 71% | 50% | 56% | 43% | 50% | 65% | 71% | 50% | 59% | 78% | 65% | 68% |

-continued

| | | | | | | | | | | | | |
|---|---|---|---|---|---|---|---|---|---|---|---|---|
| 59% | 59% | 50% | 59% | 53% | 71% | 59% | 59% | 31% | 40% | 50% | 71% | 78% |
| 65% | 56% | 65% | 71% | 56% | 65% | 75% | 65% | 65% | 68% | 53% | 65% | 46% |
| 56% | 62% | 59% | 40% | 50% | 40% | 65% | 62% | 71% | 53% | 59% | 59% | 68% |
| 78% | 56% | 65% | 71% | 59% | 53% | 71% | 75% | 68% | 56% | 68% | 71% | 40% |
| 50% | 65% | 53% | 56% | 56% | 71% | 65% | 59% | 71% | 65% | 71% | 56% | 50% |
| 34% | 59% | 71% | 75% | 65% | 65% | 62% | 53% | 68% | 71% | 59% | 75% | 71% |
| 78% | 56% | 65% | 50% | 50% | 71% | 93% | 81% | 75% | 71% | 68% | 75% | 59% |
| 65% | 75% | 53% | 59% | 81% | 65% | 71% | 81% | 78% | 84% | 46% | 50% | 43% |
| 65% | 75% | 62% | 87% | 81% | 68% | 71% | 53% | 71% | 65% | 53% | 71% | 78% |
| 81% | 78% | 56% | 59% | 59% | 40% | 53% | 59% | 75% | 71% | 43% | 59% | 59% |
| 62% | 75% | 78% | 90% | 68% | 59% | 37% | 53% | 71% | 87% | 71% | 50% | 25% |
| 43% | 71% | 56% | 65% | 68% | 71% | 71% | 81% | 43% | 62% | 56% | 62% | 84% |
| 59% | 59% | 65% | 65% | 90% | 87% | 59% | 62% | 68% | 59% | 78% | 65% | 81% |
| 56% | 65% | 90% | 65% | 84% | 84% | 62% | 65% | 75% | 81% | 71% | 81% | 71% |
| 43% | 62% | 62% | 68% | 68% | 68% | 78% | 90% | 62% | 65% | 62% | 25% | 46% |
| 84% | 75% | 87% | 68% | 65% | 37% | 59% | 78% | 90% | 71% | 84% | 62% | 71% |
| 65% | 40% | 59% | 81% | 62% | 68% | 90% | 68% | 71% | 62% | 78% | 75% | 56% |
| 59% | 81% | 90% | 53% | 68% | 78% | 68% | 71% | 62% | 72% | 81% | 68% | 62% |
| 59% | 71% | 90% | 75% | 75% | 53% | 34% | 62% | 78% | 87% | 90% | 62% | 71% |
| 62% | 59% | 84% | 65% | 90% | 90% | 56% | 68% | 75% | 65% | 56% | 59% | 59% |
| 71% | 84% | 81% | 53% | 68% | 53% | 59% | 71% | 71% | 81% | 90% | 65% | 71% |
| 65% | 59% | 81% | 84% | 68% | 53% | 50% | 71% | 75% | 56% | 78% | 56% | 71% |
| 81% | 46% | 65% | 78% | 93% | 87% | 71% | 75% | 62% | 59% | 81% | 71% | 65% |
| 71% | 71% | 78% | 75% | 81% | 62% | 65% | 75% | 65% | 81% | 62% | 71% | 93% |
| 87% | 50% | 59% | 59% | 62% | 75% | 81% | 62% | 62% | 71% | 78% | 81% | 87% |
| 87% | 65% | 53% | 62% | 46% | 71% | 93% | 81% | 75% | 71% | 37% | 59% | 71% |
| 50% | 68% | 93% | 81% | 62% | 62% | 81% | 59% | 75% | 78% | 78% | 90% | 78% |
| 62% | 56% | 68% | 81% | 43% | 62% | 84% | | | | | | |

h_value 0 0 0
0 0 1
0 0 1
0 1 0
0 1 0
0 1 1
0 1 1
1 0 0
0 0 1
0 1 0
0 1 0
0 1 1
0 1 1
1 0 0
1 0 0
1 0 0
0 1 0
0 1 1
0 1 1
1 0 0
1 0 0
1 0 1
1 0 1
1 1 0
1 0 0
1 0 0
1 0 0
1 0 1
1 0 1
1 1 0
1 1 0
1 1 1 layer number = 2

| | | | | | | | |
|---|---|---|---|---|---|---|---|
| 4 | 2 | 3 | 1 | 1 | 3 | −2 | −1 |
| 4 | 1 | 2 | 1 | 1 | −5 | −1 | 1 |
| −2 | −1 | −1 | −1 | −1 | 4 | 3 | 4 |

weight 2

| | | | | | | | |
|---|---|---|---|---|---|---|---|
| −4 | −2 | −3 | −1 | −1 | −4 | 0 | −1 |
| −4 | −1 | −2 | −1 | −1 | 6 | 1 | 0 |
| 2 | 1 | 2 | 1 | 1 | −4 | −3 | −4 |

new input 0 0 0 0 0 0 0 0
0 0 0 0 1 0 0 1
0 0 0 1 0 0 0 1
0 0 0 1 1 0 1 0
0 0 1 0 0 0 1 0
0 0 1 0 1 0 1 1
0 0 1 1 0 0 1 1
0 0 1 1 1 1 0 0
0 1 0 0 0 0 0 1
0 1 0 0 1 0 1 0
0 1 0 1 0 0 1 0
0 1 0 1 1 0 1 1

-continued 01100011
01101100
01110100
01111100
10000010
10001011
10010011
10011100
10100100
10101101
10110101
10111110
11000100
11001100
11010100
11011101
11100101
11101110
11110110
11111111

| | | | | | | | | | | | | |
|---|---|---|---|---|---|---|---|---|---|---|---|---|
| 3% | 28% | 71% | 78% | 87% | 75% | 87% | 87% | 84% | 84% | 90% | 93% | 81% |
| 93% | 87% | 93% | 87% | 75% | 87% | 93% | 93% | 81% | 87% | 87% | 90% | 81% |
| 93% | 93% | 75% | 87% | 93% | 94% | 71% | 87% | 93% | 87% | 84% | 93% | 93% |
| 81% | 93% | 93% | 87% | 81% | 87% | 93% | 87% | 71% | 75% | 93% | 93% | 87% |
| 93% | 78% | 87% | 93% | 76% | 76% | 78% | 81% | 87% | 93% | 93% | 93% | 75% |
| 87% | 93% | 93% | 93% | 81% | 87% | 93% | 93% | 78% | 93% | 93% | 93% | 78% |
| 87% | 93% | 93% | 87% | 78% | 87% | 93% | 87% | 90% | 93% | 93% | 84% | 93% |
| 93% | 78% | 93% | 93% | 93% | 81% | 93% | 93% | 93% | 84% | 93% | 93% | 90% |
| 87% | 93% | 90% | 87% | 93% | 84% | 93% | 87% | 93% | 90% | 93% | 87% | 90% |
| 93% | 93% | 84% | 93% | 93% | 90% | 93% | 68% | 90% | 93% | 93% | 90% | 93% |
| 87% | 90% | 93% | 93% | 84% | 93% | 93% | 90% | 87% | 93% | 90% | 71% | 84% |
| 93% | 87% | 84% | 93% | 93% | 90% | 93% | 90% | 93% | 90% | 90% | 87% | 90% |
| 87% | 87% | 93% | 93% | 87% | 96% | 96% | 96% | 93% | 96% | 96% | 100% | |

h_value 000
001
001
010
010
011
011
100
001
010
010
011
011
100
100
101
010
011
011
100
100
101
101
110
110
100
100
101
101
110
110
111 layer number = 3

| | | | | | | | |
|---|---|---|---|---|---|---|---|
| 3 | 1 | 2 | 0 | 0 | 4 | −4 | −3 |
| 4 | 1 | 1 | −1 | −1 | −5 | 3 | −1 |
| −2 | 0 | −1 | 0 | 0 | 4 | 2 | 5 |

weight 2

| | | | | | | | |
|---|---|---|---|---|---|---|---|
| −3 | −2 | −3 | −2 | −2 | −4 | 0 | −1 |
| −4 | −2 | −1 | 0 | 0 | 5 | −1 | 2 |
| 3 | −1 | 2 | −1 | −1 | −4 | −2 | 4 |

recall 000
001
001
010
010
011
011

-continued

| |
|---|
| 1 0 0 |
| 0 0 1 |
| 0 1 0 |
| 0 1 0 |
| 0 1 1 |
| 0 1 1 |
| 1 0 0 |
| 1 0 0 |
| 1 0 1 |
| 0 1 0 |
| 0 1 1 |
| 0 1 1 |
| 1 0 0 |
| 1 0 0 |
| 1 0 1 |
| 1 0 1 |
| 1 1 0 |
| 1 1 0 |
| 1 0 0 |
| 1 0 0 |
| 1 0 1 |
| 1 0 1 |
| 1 1 0 |
| 1 1 0 |
| 1 1 1 |

Input file name is "a"
Connection type is 2
Max. weight sum=40
Number of learnings=300
Initial weight value=0
Max weight is used
Displayed percent is a variable unit
Delta weight is uninitialized

| | |
|---|---|
| 0 0 0 0 0 | 0 0 0 |
| 0 0 0 0 1 | 0 0 1 |
| 0 0 0 1 0 | 0 0 1 |
| 0 0 0 1 1 | 0 1 0 |
| 0 0 1 0 0 | 0 1 0 |
| 0 0 1 0 1 | 0 1 1 |
| 0 0 1 1 0 | 0 1 1 |
| 0 0 1 1 1 | 1 0 0 |
| 0 1 0 0 0 | 0 0 1 |
| 0 1 0 0 1 | 0 1 0 |
| 0 1 0 1 0 | 0 1 0 |
| 0 1 0 1 1 | 0 1 1 |
| 0 1 1 0 0 | 0 1 1 |
| 0 1 1 0 1 | 1 0 0 |
| 0 1 1 1 0 | 1 0 0 |
| 0 1 1 1 1 | 1 0 1 |
| 1 0 0 0 0 | 0 1 0 |
| 1 0 0 0 1 | 0 1 1 |
| 1 0 0 1 0 | 0 1 1 |
| 1 0 0 1 1 | 1 0 0 |
| 1 0 1 0 0 | 1 0 0 |
| 1 0 1 0 1 | 1 0 1 |
| 1 0 1 1 0 | 1 0 1 |
| 1 0 1 1 1 | 1 1 0 |
| 1 1 0 0 0 | 1 1 0 |
| 1 1 0 0 1 | 1 0 0 |
| 1 1 0 1 0 | 1 0 0 |
| 1 1 0 1 1 | 1 0 1 |
| 1 1 1 0 0 | 1 0 1 |
| 1 1 1 0 1 | 1 1 0 |
| 1 1 1 1 0 | 1 1 0 |
| 1 1 1 1 1 | 1 1 1 |

| | | | | | | | | | | | | |
|---|---|---|---|---|---|---|---|---|---|---|---|---|
| 3% | 3% | 3% | 28% | 15% | 25% | 25% | 25% | 25% | 25% | 25% | 15% | 34% |
| 21% | 25% | 25% | 18% | 25% | 21% | 28% | 28% | 25% | 25% | 28% | 28% | 28% |
| 25% | 21% | 28% | 25% | 21% | 21% | 21% | 21% | 25% | 28% | 28% | 25% | 25% |
| 34% | 28% | 25% | 25% | 21% | 28% | 25% | 28% | 21% | 25% | 25% | 25% | 28% |
| 21% | 25% | 25% | 28% | 28% | 21% | 25% | 21% | 34% | 25% | 25% | 28% | 21% |
| 25% | 21% | 28% | 28% | 25% | 25% | 28% | 28% | 28% | 25% | 25% | 28% | 25% |
| 21% | 21% | 21% | 25% | 25% | 28% | 28% | 25% | 25% | 34% | 28% | 25% | 25% |
| 21% | 21% | 21% | 25% | 28% | 21% | 25% | 25% | 28% | 31% | 25% | 25% | 28% |
| 28% | 21% | 25% | 21% | 28% | 25% | 25% | 28% | 21% | 25% | 21% | 28% | 28% |
| 25% | 25% | 21% | 34% | 25% | 25% | 21% | 21% | 25% | 25% | 31% | 21% | 25% |
| 25% | 28% | 28% | 25% | 25% | 28% | 28% | 25% | 21% | 21% | 21% | 21% | 25% |

-continued

| | | | | | | | | | | | | |
|---|---|---|---|---|---|---|---|---|---|---|---|---|
| 28% | 28% | 25% | 25% | 34% | 28% | 25% | 25% | 21% | 28% | 25% | 28% | 21% |
| 25% | 25% | 25% | 28% | 21% | 25% | 25% | 28% | 28% | 21% | 25% | 21% | 34% |
| 25% | 25% | 28% | 21% | 25% | 21% | 28% | 28% | 25% | 25% | 28% | 28% | 28% |
| 25% | 25% | 28% | 25% | 21% | 21% | 21% | 25% | 25% | 28% | 28% | 25% | 25% |
| 34% | 28% | 25% | 25% | 21% | 21% | 21% | 25% | 28% | 21% | 25% | 25% | 28% |
| 31% | 25% | 25% | 28% | 28% | 21% | 25% | 21% | 28% | 25% | 25% | 28% | 21% |
| 25% | 21% | 28% | 28% | 25% | 25% | 21% | 34% | 25% | 25% | 21% | 21% | 25% |
| 25% | 31% | 21% | 25% | 25% | 28% | 28% | 25% | 25% | 28% | 28% | 25% | 21% |
| 21% | 21% | 21% | 25% | 28% | 28% | 25% | 25% | 34% | 28% | 25% | 25% | 21% |
| 28% | 25% | 28% | 21% | 25% | 25% | 25% | 28% | 21% | 25% | 25% | 28% | 28% |
| 21% | 25% | 21% | 34% | 25% | 25% | 28% | 21% | 25% | 21% | 28% | 28% | 25% |
| 25% | 28% | 28% | 28% | 25% | 25% | 28% | 25% | 21% | 21% | 21% | 25% | 25% |
| 28% | 28% | | | | | | | | | | | |

| h_value |
|---|
| 0 1 1 |
| 0 1 1 |
| 0 1 1 |
| 0 1 1 |
| 0 1 1 |
| 0 1 1 |
| 0 1 1 |
| 1 1 1 |
| 0 1 0 |
| 0 1 1 |
| 0 1 1 |
| 0 1 1 |
| 0 1 1 |
| 1 1 1 |
| 1 1 1 |
| 1 1 1 |
| 0 1 0 |
| 0 1 1 |
| 0 1 1 |
| 1 1 1 |
| 1 1 1 |
| 1 1 1 |
| 1 1 1 |
| 1 1 1 |
| 1 1 0 |
| 1 1 0 |
| 1 1 0 |
| 1 1 0 |
| 1 1 0 |
| 1 1 0 |
| 1 1 0 |
| 1 1 1 |

| layer number = 0 | |
|---|---|
| 9 | 7 8 7 7 |
| 0 | 0 0 0 0 |
| −8 | −8 8 8 8 |

-continued weight 2

−20 −2 −16 0 0
0 0 0 0 0
10 10 −5 −5 −5 new input 00000011
00001011
00010011
00011011
00100011
00101011
00110011
00111111
01000010
01001011
01010011
01011011
01100011
01101111
01110111
01111111
10000010
10001011
10010011
10011111
10100111
10101111
10110111
10111111
11000110
11001110
11010110
11011110
11100110
11101110
11110110
11111111

3% 3% 25% 40% 28% 37% 31% 34% 28% 37% 46% 46% 40%
43% 46% 43% 50% 50% 50% 53% 46% 43% 56% 50% 62% 71%
65% 56% 62% 62% 62% 62% 62% 46% 50% 40% 43% 40% 43%
31% 46% 46% 53% 34% 53% 53% 28% 53% 56% 40% 40% 56%
59% 53% 53% 53% 59% 56% 65% 53% 46% 65% 62% 62% 56%
50% 34% 40% 46% 56% 56% 43% 50% 43% 59% 53% 50% 37%
25% 46% 71% 65% 50% 46% 53% 59% 71% 43% 40% 68% 65%
53% 25% 37% 71% 46% 50% 59% 50% 46% 34% 53% 50% 62%
65% 59% 46% 59% 59% 53% 50% 56% 50% 53% 37% 40% 37%
34% 28% 50% 56% 50% 56% 59% 68% 53% 50% 31% 50% 65%
53% 56% 59% 46% 34% 68% 50% 31% 56% 65% 46% 53% 59%
53% 25% 46% 65% 46% 56% 40% 62% 53% 62% 71% 59% 53%
53% 50% 43% 65% 65% 62% 59% 50% 34% 31% 43% 65% 46%
50% 56% 59% 50% 68% 59% 59% 56% 34% 34% 62% 65% 50%
46% 62% 46% 65% 50% 46% 62% 56% 59% 53% 43% 50% 46%
46% 65% 56% 59% 62% 68% 53% 46% 53% 56% 71% 50% 43%
50% 53% 46% 50% 56% 40% 40% 40% 53% 65% 46% 43% 46%
56% 50% 56% 43% 62% 65% 53% 59% 50% 46% 46% 43% 46%
65% 53% 34% 50% 53% 65% 62% 62% 56% 59% 62% 56% 43%
50% 53% 56% 56% 56% 34% 34% 43% 50% 56% 43% 50% 56%
59% 68% 56% 62% 68% 40% 46% 46% 50% 34% 50% 65% 56%
53% 53% 56% 40% 46% 59% 31% 50% 37% 46% 40% 50% 56%
71% 62% 53% 53% 46% 40% 53% 40% 53% 59% 65% 50% 43%
46% 40% h_value 000
000
000
010
010
011
011
100
000
010
010
011
011
100
100
100
010

-continued 011
011
100
100
100
100
110
100
100
100
100
100
110
110
111 layer number = 1

86755 4 0 −1
84100 −13 4 6
34544 −6 −5 −5 weight 2

−8 −4 −7 −2 −2 −13 0 0
−9 −6 −4 −3 −3 10 0 −1
−8 −2 −5 −2 −2 13 0 −6 new point 00000000
00001000
00010000
00011010
00100010
00101011
00110011
00111100
01000000
01001010
01010010
01011011
01100011
01101100
01110100
01111100
10000010
10001011
10010011
10011100
10100100
10101100
10110100
10111110
11000100
11001100
11010100
11011100
11100100
11101110
11110110
11111111

3% 25% 40% 53% 71% 81% 78% 75% 75% 71% 68% 71% 90%
53% 71% 71% 65% 96% 78% 65% 71% 71% 71% 53% 65% 90%
71% 71% 75% 71% 62% 71% 84% 96% 93% 100% h_value 000
001
001
010
010
011
011
100
001
010
010
011
011
100
100
101
010
011

-continued

```
0 1 1
1 0 0
1 0 0
1 0 1
1 0 1
1 1 0
1 1 0
1 0 0
1 0 0
1 0 1
1 0 1
1 1 0
1 1 0
1 1 1
```

layer number = 2

```
7 4   6   3   3   5 -5 -4
8 3  -1  -1  -1  -5 10  6
5 4   5   3   3  -8 -7  1
```

weight 2

```
 -7 -4 -6 -3 -3 -9 -1 -2
-12 -6  0  0  0 13 -6  0
 -4 -2 -4 -1 -1 10  7 -8
```

recall

```
0 0 0
0 0 1
0 0 1
0 1 0
0 1 0
0 1 1
0 1 1
1 0 0
0 0 1
0 1 0
0 1 0
0 1 1
0 1 1
1 0 0
1 0 0
1 0 1
0 1 0
0 1 1
0 1 1
1 0 0
1 0 0
1 0 1
1 0 1
1 1 0
1 1 0
1 0 0
1 0 0
1 0 1
1 0 1
1 1 0
1 1 0
1 1 1
```

Input file name is "a"
Connection type is 2
Max weight sum=40
Number of learnings=500
Initial weight value=0
Max weight is used
Displayed percent is a variable unit
Delta weight is uninitialized

```
00000  000
00001  001
00010  001
00011  010
00100  010
00101  011
00110  011
00111  100
01000  001
01001  010
```

-continued

```
01010  010
01011  011
01100  011
01101  100
01110  100
01111  101
10000  010
10001  011
10010  011
10011  100
10100  100
10101  101
10110  101
10111  110
11000  110
11001  100
11010  100
11011  101
11100  101
11101  110
11110  110
11111  111
 3%  3%  3% 28% 15% 25% 25% 25% 25% 25% 25% 15% 34%
21% 25% 25% 18% 25% 21% 28% 28% 25% 25% 28% 28% 28%
25% 21% 28% 25% 21% 21% 21% 21% 25% 28% 28% 25% 25%
34% 28% 25% 25% 21% 28% 25% 28% 21% 25% 25% 25% 28%
21% 25% 25% 28% 28% 21% 25% 21% 34% 25% 25% 28% 21%
25% 21% 28% 28% 25% 25% 28% 28% 28% 25% 25% 28% 25%
21% 21% 21% 25% 25% 28% 28% 25% 25% 34% 28% 25% 25%
21% 21% 21% 25% 28% 21% 25% 25% 28% 31% 25% 25% 28%
28% 21% 25% 21% 28% 25% 25% 28% 21% 25% 21% 28% 28%
25% 25% 21% 34% 25% 25% 21% 21% 25% 25% 31% 21% 25%
25% 28% 28% 25% 25% 28% 28% 25% 21% 21% 21% 21% 25%
28% 28% 25% 25% 34% 28% 25% 25% 21% 28% 25% 28% 21%
25% 25% 25% 28% 21% 25% 25% 28% 28% 21% 25% 21% 34%
25% 25% 28% 21% 25% 21% 28% 28% 25% 25% 28% 28% 28%
25% 25% 28% 25% 21% 21% 21% 25% 25% 28% 28% 25% 25%
34% 28% 25% 25% 21% 21% 21% 25% 28% 21% 25% 25% 28%
31% 25% 25% 28% 28% 21% 25% 21% 28% 25% 25% 28% 21%
25% 21% 28% 28% 25% 25% 21% 34% 25% 25% 21% 21% 25%
25% 31% 21% 25% 25% 28% 28% 25% 25% 28% 28% 25% 21%
21% 21% 21% 25% 28% 28% 25% 25% 34% 28% 25% 25% 21%
28% 25% 28% 21% 25% 25% 25% 28% 21% 25% 25% 28% 28%
21% 25% 21% 34% 25% 25% 28% 21% 25% 21% 28% 28% 25%
25% 28% 28% 28% 25% 25% 28% 25% 21% 21% 21% 25% 25%
28% 28% 25% 25% 34% 28% 25% 25% 21% 21% 21% 25% 28%
21% 25% 25% 28% 31% 25% 25% 28% 28% 21% 25% 21% 28%
25% 25% 28% 21% 25% 21% 28% 28% 25% 25% 21% 34% 25%
25% 21% 21% 25% 25% 31% 21% 25% 25% 28% 28% 25% 25%
28% 28% 25% 21% 21% 21% 21% 25% 28% 28% 25% 25% 34%
28% 25% 25% 21% 28% 25% 28% 21% 25% 25% 25% 28% 21%
25% 25% 28% 28% 21% 25% 21% 34% 25% 25% 28% 21% 25%
21% 28% 28% 25% 25% 28% 28% 28% 25% 25% 28% 25% 21%
21% 21% 25% 25% 28% 28% 25% 25% 34% 28% 25% 25% 21%
21% 21% 25% 28% 21% 25% 25% 28% 31% 25% 25% 28% 28%
21% 25% 21% 28% 25% 25% 28% 21% 25% 21% 28% 28% 25%
25% 21% 34% 25% 25% 21% 21% 25% 25% 31% 21% 25% 25%
28% 28% 25% 25% 28% 28% 25% 21% 21% 21% 21% 25% 28%
28% 25% 25% 34% 28% 25% 25% 21% 28% 25% 28% 21% 25%
25% 25% 28% 21% 25% 25% 28% 28% 21% 25% 21% 34% 25%
25% 28% 21% 25% 21% 28% 28%
```

h_value

```
0 1 1
0 1 1
0 1 1
0 1 1
0 1 1
0 1 1
0 1 1
1 1 1
0 1 0
0 1 1
0 1 1
0 1 1
0 1 1
1 1 1
1 1 1
1 1 1
0 1 0
0 1 1
0 1 1
```

-continued 1 1 1
1 1 1
1 1 1
1 1 1
1 1 1
1 1 0
1 1 0
1 1 0
1 1 0
1 1 0
1 1 0
1 1 0
1 1 1 layer number = 0

9 7 8 7 7
0 0 0 0 0
−8 −8 8 8 8 weight 2

−20 −2 −16 0 0
0 0 0 0 0
10 10 −5 −5 −5 new input 0 0 0 0 0 0 1 1
0 0 0 0 1 0 1 1
0 0 0 1 0 0 1 1
0 0 0 1 1 0 1 1
0 0 1 0 0 0 1 1
0 0 1 0 1 0 1 1
0 0 1 1 0 0 1 1
0 0 1 1 1 1 1 1
0 1 0 0 0 0 1 0
0 1 0 0 1 0 1 1
0 1 0 1 0 0 1 1
0 1 0 1 1 0 1 1
0 1 1 0 0 0 1 1
0 1 1 0 1 1 1 1
0 1 1 1 0 1 1 1
0 1 1 1 1 1 1 1
1 0 0 0 0 0 1 0
1 0 0 0 1 0 1 1
1 0 0 1 0 0 1 1
1 0 0 1 1 1 1 1
1 0 1 0 0 1 1 1
1 0 1 0 1 1 1 1
1 0 1 1 0 1 1 1
1 0 1 1 1 1 1 1
1 1 0 0 0 1 1 0
1 1 0 0 1 1 1 0
1 1 0 1 0 1 1 0
1 1 0 1 1 1 1 0
1 1 1 0 0 1 1 0
1 1 1 0 1 1 1 0
1 1 1 1 0 1 1 0
1 1 1 1 1 1 1 1

3% 3% 21% 34% 28% 40% 25% 34% 25% 46% 40% 50% 34%
46% 59% 53% 65% 62% 59% 37% 34% 31% 50% 59% 62% 59%
53% 50% 46% 59% 53% 46% 62% 62% 50% 50% 46% 46% 50%
53% 46% 43% 59% 37% 25% 59% 46% 46% 53% 50% 59% 46%
43% 37% 43% 28% 50% 65% 40% 50% 56% 59% 53% 43% 53%
59% 71% 65% 68% 71% 46% 40% 53% 53% 56% 62% 46% 46%
34% 37% 40% 59% 53% 59% 62% 59% 50% 46% 53% 46% 53%
62% 50% 53% 50% 50% 50% 53% 65% 50% 31% 56% 56% 65%
62% 56% 56% 56% 53% 71% 53% 53% 50% 56% 50% 56% 37%
40% 50% 59% 46% 50% 53% 59% 53% 25% 43% 62% 50% 59%
56% 53% 46% 46% 50% 62% 56% 50% 50% 46% 50% 46% 50%
46% 59% 62% 53% 40% 34% 40% 56% 59% 65% 50% 40% 50%
50% 56% 43% 46% 53% 53% 50% 40% 50% 37% 53% 62% 62%
59% 62% 62% 56% 56% 50% 40% 40% 37% 37% 62% 28% 34%
59% 53% 37% 31% 59% 59% 68% 71% 56% 62% 59% 59% 50%
34% 53% 62% 59% 50% 46% 53% 68% 43% 50% 56% 68% 53%
53% 59% 71% 56% 62% 40% 43% 37% 68% 59% 50% 43% 34%
50% 50% 62% 56% 43% 53% 56% 50% 50% 53% 56% 56% 59%
56% 59% 34% 56% 56% 43% 37% 25% 37% 46% 56% 59% 59%
65% 56% 46% 53% 46% 31% 37% 25% 37% 53% 71% 56% 59%
62% 62% 59% 68% 53% 46% 46% 59% 43% 37% 59% 46% 46%
62% 43% 53% 56% 50% 59% 40% 46% 43% 50% 46% 56% 50%
62% 62% 43% 43% 40% 65% 62% 40% 53% 43% 46% 43% 40%
31% 43% 59% 62% 53% 43% 50% 56% 65% 56% 53% 65% 62%
43% 40% 50% 56% 62% 56% 53% 53% 65% 50% 50% 34% 40%

-continued

53% 62% 56% 56% 37% 50% 71% 43% 46% 56% 65% 40% 43%
31% 46% 50% 43% 50% 50% 56% 46% 68% 46% 71% 50% 34%
46% 37% 43% 50% 65% 53% 50% 37% 28% 40% 46% 46% 59%
25% 37% 65% 31% 56% 65% 43% 40% 25% 46% 65% 62% 65%
62% 46% 50% 53% 56% 65% 56% 43% 25% 34% 40% 59% 56%
46% 53% 46% 56% 46% 59% 62% 40% 68% 46% 46% 50% 56%
43% 46% 56% 46% 25% 37% 37% 56% 65% 56% 62% 59% 50%
53% 65% 56% 59% 62% 59% 56% 56% 53% 68% 46% 37% 37%
31% 50% 59% 53% 50% 62% 50% 65% 50% 43% 46% 56% 53%
59% 62% 65% 59% 56% 65% 53% 25% 34% 53% 68% 68% 59%
75% 53% 53% 46% 28% 34% 59% 56% 50% 46% 50% 43% 50%
62% 46% 43% 25% 50% 65% 62% 62% 68% 65% 68% 59% 46%
50% 53% 53% 53% 56% 46% 40% 62% 40% 65% 50% 62% 62%
68% 53% 40% 59% 65% 53% 37% h_value 0 0 0
0 0 0
0 0 0
0 1 0
0 1 0
0 1 1
0 1 1
1 0 0
0 0 0
0 1 0
0 1 0
0 1 1
0 1 1
1 0 0
1 0 0
1 0 1
0 1 1
0 1 1
0 1 1
1 0 0
1 0 0
1 0 1
1 0 1
1 1 1
1 0 0
1 0 0
1 0 0
1 0 1
1 0 1
1 1 1
1 1 1
1 1 1 layer number = 1

8 6 7 5 5 4 0 −1
8 4 1 0 0 −12 4 5
6 5 5 5 5 −3 −4 −5 weight 2

−8 −4 −7 −2 −2 −13 0 0
−9 −6 −5 −3 −3 11 0 0
−8 −3 −6 0 0 12 0 −5 new input 0 0 0 0 0 0 0 0
0 0 0 0 1 0 0 0
0 0 0 1 0 0 0 0
0 0 0 1 1 0 1 0
0 0 1 0 0 0 1 0
0 0 1 0 1 0 1 1
0 0 1 1 0 0 1 1
0 0 1 1 1 1 0 0
0 1 0 0 0 0 0 0
0 1 0 0 1 0 1 0
0 1 0 1 0 0 1 0
0 1 0 1 1 0 1 1
0 1 1 0 0 0 1 1
0 1 1 0 1 1 0 0
0 1 1 1 0 1 0 0
0 1 1 1 1 1 0 1
1 0 0 0 0 0 1 1
1 0 0 0 1 0 1 1
1 0 0 1 0 0 1 1
1 0 0 1 1 1 0 0
1 0 1 0 0 1 0 0
1 0 1 0 1 1 0 1

-continued

```
10110101
10111111
11000100
11001100
11010100
11011101
11100101
11101111
11110111
11111111
```

3% 28% 68% 59% 75% 71% 56% 71% 84% 78% 84% 93% 96% 87% 93% 93% 90% 96% 96% 93% 96% 96% 87% 96% 96% 96% 100% h_value

```
000
001
001
010
010
011
011
100
001
010
010
011
011
100
100
101
010
011
011
100
100
101
101
110
110
100
100
101
101
110
110
111
```

layer number = 2

```
74   6   3   3   5  -5  -4
93  -1  -1  -1  -8  11   0
24   3   4   4  -8  -9   2
```

weight 2

```
 -7  -4  -6  -3  -3 -10  -1  -1
-11  -6   0   0   0  10  -6   2
  1  -2  -1  -2  -2   6   9 -13
```

recall

```
000
```

-continued

```
001
001
010
010
011
011
100
001
010
010
011
011
100
100
101
010
011
011
100
100
101
101
110
110
100
100
101
101
110
110
111
```

EMBODIMENT II

A circuit for generating a sine curve

The number of layers is shown in table 2 in the same condition as the embodiment I, and the results are shown in List II.

TABLE 2

| M learning number | 300 | 500 |
|---|---|---|
| 20 | 4 | 4 |
| 40 | 3 | 2 |

List II

Input file name is "s"
Connection type is 2
Max. weight sum=20
Number of learnings=300
Initial weight value=0
Max. weight is used
Displayed percent is a variable unit
Delta weight is uninitialized input/output

| | |
|---|---|
| 0000 | 0000 |
| 0001 | 0011 |
| 0010 | 0101 |
| 0011 | 1000 |
| 0100 | 1010 |
| 0101 | 1011 |
| 0110 | 1101 |
| 0111 | 1110 |
| 1000 | 1111 |
| 1001 | 1111 |

(Error percentage)

| | | | | | | | | | | | | |
|---|---|---|---|---|---|---|---|---|---|---|---|---|
| 20% | 10% | 10% | 30% | 30% | 50% | 20% | 30% | 30% | 50% | 30% | 40% | 40% |
| 50% | 40% | 50% | 60% | 50% | 40% | 60% | 40% | 40% | 60% | 60% | 40% | 50% |
| 40% | 50% | 60% | 50% | 50% | 50% | 50% | 60% | 60% | 50% | 50% | 50% | 40% |
| 20% | 50% | 60% | 40% | 40% | 50% | 50% | 40% | 40% | 60% | 40% | 40% | 60% |
| 40% | 40% | 60% | 60% | 40% | 60% | 40% | 60% | 60% | 50% | 60% | 30% | 40% |
| 50% | 50% | 40% | 50% | 40% | 40% | 40% | 50% | 40% | 50% | 60% | 30% | 40% |
| 50% | 50% | 40% | 60% | 40% | 60% | 60% | 50% | 50% | 40% | 40% | 50% | 50% |

-continued

| | | | | | | | | | | | | |
|---|---|---|---|---|---|---|---|---|---|---|---|---|
| 40% | 50% | 50% | 40% | 60% | 40% | 60% | 60% | 60% | 50% | 60% | 60% | 30% |
| 50% | 40% | 50% | 50% | 50% | 50% | 50% | 40% | 50% | 50% | 40% | 60% | 40% |
| 40% | 60% | 60% | 40% | 50% | 50% | 60% | 50% | 40% | 50% | 50% | 60% | 40% |
| 50% | 40% | 60% | 60% | 50% | 50% | 60% | 60% | 50% | 50% | 60% | 50% | 40% |
| 50% | 50% | 50% | 50% | 60% | 50% | 50% | 60% | 50% | 40% | 40% | 50% | 50% |
| 30% | 50% | 50% | 50% | 50% | 50% | 30% | 50% | 60% | 50% | 50% | 50% | 40% |
| 40% | 60% | 60% | 50% | 50% | 50% | 50% | 40% | 60% | 50% | 40% | 60% | 50% |
| 20% | 30% | 60% | 40% | 40% | 60% | 40% | 40% | 60% | 50% | 60% | 60% | 40% |
| 50% | 60% | 60% | 50% | 40% | 50% | 50% | 50% | 50% | 50% | 50% | 50% | 40% |
| 50% | 40% | 50% | 60% | 50% | 60% | 60% | 50% | 40% | 40% | 50% | 50% | 60% |
| 60% | 50% | 50% | 50% | 50% | 60% | 50% | 60% | 60% | 40% | 50% | 60% | 40% |
| 60% | 50% | 50% | 60% | 60% | 60% | 50% | 50% | 50% | 50% | 50% | 50% | 50% |
| 50% | 60% | 50% | 50% | 60% | 40% | 60% | 60% | 60% | 50% | 60% | 60% | 50% |
| 50% | 50% | 60% | 60% | 60% | 60% | 50% | 60% | 40% | 60% | 60% | 60% | 60% |
| 60% | 50% | 50% | 20% | 60% | 50% | 60% | 60% | 50% | 60% | 60% | 60% | 50% |
| 60% | 60% | 50% | 50% | 60% | 50% | 50% | 50% | 50% | 30% | 50% | 60% | 40% |
| 40% | 50% | | | | | | | | | | | |

h_(value actual output)

0 0 0 1
0 0 1 1
0 1 0 1
0 0 0 1
1 0 1 1
1 0 1 1
1 1 0 1
1 1 1 1
1 1 1 1
1 1 1 1 layer number = 0

| | | | | |
|---|---|---|---|---|
| 5 | 5 | 4 | 4 | INPUT "1" |
| 9 | 3 | 6 | 0 | |
| 5 | 5 | −4 | 5 | |
| 6 | 4 | 4 | 4 | |

weight 2

| | | | | |
|---|---|---|---|---|
| −5 | −5 | 1 | 4 | INPUT "0" |
| −9 | 0 | −5 | 4 | |
| −5 | −4 | 5 | −4 | |
| −1 | 5 | 5 | 6 | |

new input 0 0 0 0 0 0 0 1
0 0 0 1 0 0 1 1
0 0 1 0 0 1 0 1
0 0 1 1 0 0 0 1
0 1 0 0 1 0 1 1
0 1 0 1 1 0 1 1
0 1 1 0 1 1 0 1
0 1 1 1 1 1 1 1
1 0 0 0 1 1 1 1
1 0 0 1 1 1 1 1

| | | | | | | | | | | | | |
|---|---|---|---|---|---|---|---|---|---|---|---|---|
| 20% | 10% | 10% | 30% | 50% | 40% | 50% | 40% | 40% | 60% | 60% | 50% | 60% |
| 50% | 60% | 70% | 70% | 50% | 70% | 70% | 70% | 60% | 70% | 60% | 60% | 70% |
| 60% | 50% | 60% | 70% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | | | | | | | | | | | |

h_value 0 0 0 1
0 0 1 1
0 1 0 1
1 0 0 0
1 0 1 0
1 0 1 1
1 1 0 1
1 1 1 1

-continued 1 1 1 1
1 1 1 1
layer number = 1

| | | | | | | | |
|---|---|---|---|---|---|---|---|
| 4 | 4 | 4 | 4 | 0 | 0 | 0 | 0 |
| 5 | 2 | 4 | 0 | 1 | 4 | 0 | 1 |
| 3 | 3 | −3 | 3 | 1 | 0 | 3 | 0 |
| 3 | 0 | −3 | 1 | 1 | 6 | 0 | 2 |

weight 2

| | | | | | | | |
|---|---|---|---|---|---|---|---|
| −2 | 0 | −2 | 0 | −6 | 5 | 2 | 0 |
| −5 | 0 | −3 | 3 | −1 | −5 | 0 | 0 |
| −2 | −2 | 6 | −3 | −1 | 0 | −3 | 0 |
| −3 | 1 | 4 | −1 | 1 | −4 | 3 | 0 |

new point
0 0 0 0 0 0 0 1
0 0 0 1 0 0 1 1
0 0 1 0 0 1 0 1
0 0 1 1 1 0 0 0
0 1 0 0 1 0 1 0
0 1 0 1 1 0 1 1
0 1 1 0 1 1 0 1
0 1 1 1 1 1 1 1
1 0 0 0 1 1 1 1
1 0 0 1 1 1 1 1

| | | | | | | | | | | | | |
|---|---|---|---|---|---|---|---|---|---|---|---|---|
| 20% | 40% | 60% | 80% | 70% | 70% | 80% | 60% | 80% | 60% | 80% | 80% | 90% |
| 60% | 80% | 90% | 60% | 80% | 80% | 90% | 60% | 80% | 90% | 60% | 80% | 80% |
| 90% | 60% | 80% | 90% | 60% | 80% | 80% | 90% | 60% | 80% | 90% | 60% | 80% |
| 80% | 90% | 60% | 80% | 90% | 60% | 80% | 80% | 90% | 60% | 80% | 90% | 60% |
| 80% | 80% | 90% | 60% | 80% | 90% | 60% | 80% | 80% | 90% | 60% | 80% | 90% |
| 60% | 80% | 80% | 90% | 60% | 80% | 90% | 60% | 80% | 80% | 90% | 60% | 80% |
| 90% | 60% | 80% | 80% | 90% | 60% | 80% | 90% | 60% | 80% | 80% | 90% | 60% |
| 80% | 90% | 60% | 80% | 80% | 90% | 60% | 80% | 90% | 60% | 80% | 80% | 90% |
| 60% | 80% | 90% | 60% | 80% | 80% | 90% | 60% | 80% | 90% | 60% | 80% | 80% |
| 90% | 60% | 80% | 90% | 60% | 80% | 80% | 90% | 60% | 80% | 90% | 60% | 80% |
| 80% | 90% | 60% | 80% | 90% | 60% | 80% | 80% | 90% | 60% | 80% | 90% | 60% |
| 80% | 80% | 90% | 60% | 80% | 90% | 60% | 80% | 80% | 90% | 60% | 80% | 90% |
| 60% | 80% | 80% | 90% | 60% | 80% | 90% | 60% | 80% | 80% | 90% | 60% | 80% |
| 90% | 60% | 80% | 80% | 90% | 60% | 80% | 90% | 60% | 80% | 80% | 90% | 60% |
| 80% | 90% | 60% | 80% | 80% | 90% | 60% | 80% | 90% | 60% | 80% | 80% | 90% |
| 60% | 80% | 90% | 60% | 80% | 80% | 90% | 60% | 80% | 90% | 60% | 80% | 80% |
| 90% | 60% | 80% | 90% | 60% | 80% | 80% | 90% | 60% | 80% | 90% | 60% | 80% |
| 80% | 90% | 60% | 80% | 90% | 60% | 80% | 80% | 90% | 60% | 80% | 90% | 60% |
| 80% | 80% | 90% | 60% | 80% | 90% | 60% | 80% | 80% | 90% | 60% | 80% | 90% |
| 60% | 80% | 80% | 90% | 60% | 80% | 90% | 60% | 80% | 80% | 90% | 60% | 80% |
| 90% | 60% | 80% | 80% | 90% | 60% | 80% | 90% | 60% | 80% | 80% | 90% | 60% |
| 80% | 90% | 60% | 80% | 80% | 90% | 60% | 80% | 90% | 60% | 80% | 80% | 90% |
| 60% | 80% | 90% | 60% | 80% | 80% | 90% | 60% | 80% | 90% | 60% | 80% | 80% |
| 90% | 60% | | | | | | | | | | | |

h_value
0 0 0 0
0 0 1 1
0 1 0 1
1 0 0 0
1 0 1 0
1 0 1 1
1 1 0 1
1 1 1 1
1 1 1 1
1 1 1 1
layer number = 2

| | | | | | | | |
|---|---|---|---|---|---|---|---|
| 4 | 4 | 4 | 4 | 0 | 0 | 0 | 0 |
| 6 | 1 | 4 | −1 | 0 | 5 | 0 | 0 |
| 3 | 2 | −4 | 3 | 1 | 0 | 3 | 0 |
| 3 | 0 | −4 | 1 | 1 | 5 | 0 | 3 |

weight 2

| | | | | | | | |
|---|---|---|---|---|---|---|---|
| −3 | −2 | 0 | 2 | −7 | 2 | 0 | 1 |
| −5 | −1 | −3 | 1 | −1 | −5 | 0 | −1 |
| −3 | −2 | 3 | −3 | −1 | 0 | −3 | 0 |
| −4 | 0 | 4 | −2 | 0 | −4 | 2 | −1 |

new point
0 0 0 0 0 0 0 0
0 0 0 1 0 0 1 1
0 0 1 0 0 1 0 1
0 0 1 1 1 0 0 0
0 1 0 0 1 0 1 0
0 1 0 1 1 0 1 1
0 1 1 0 1 1 0 1
0 1 1 1 1 1 1 1
1 0 0 0 1 1 1 1
1 0 0 1 1 1 1 1

20% 30% 90% 90% 90% 100% h_value
0 0 0 0

-continued 0 0 1 1
0 1 0 1
1 0 0 0
1 0 1 0
1 1 0 1
1 1 0 1
1 1 1 0
1 1 1 1
1 1 1 1 layer number = 3

| | | | | | | | |
|---|---|---|---|---|---|---|---|
| 4 | 4 | 4 | 4 | 0 | 0 | 0 | 0 |
| 5 | 0 | 4 | −1 | 0 | 6 | −1 | 0 |
| 2 | 2 | −4 | 3 | 0 | 0 | 4 | 0 |
| 2 | −1 | −5 | 0 | 0 | 3 | −1 | 4 |

weight 2

| | | | | | | | |
|---|---|---|---|---|---|---|---|
| −4 | −3 | 0 | 0 | −7 | 0 | −1 | 0 |
| −4 | −1 | −3 | 0 | −1 | −5 | 0 | −1 |
| −3 | −3 | 2 | −3 | −1 | 0 | −4 | 0 |
| −3 | 0 | 4 | 0 | 1 | −3 | 2 | −3 |

recall 0 0 0 0
0 0 1 1
0 1 0 1
1 0 0 0
1 0 1 0
1 0 1 1
1 1 0 1
1 1 1 0
1 1 1 1
1 1 1 1

Input file name is "s"
Connection type is 2
Max. weight sum=20
Number of learnings=500
Initial weight value=0
Max weight is used
Displayed percent is a variable unit
Delta weight is uninitialized

| | |
|---|---|
| 0 0 0 0 | 0 0 0 0 |
| 0 0 0 1 | 0 0 1 1 |
| 0 0 1 0 | 0 1 0 1 |
| 0 0 1 1 | 1 0 0 0 |
| 0 1 0 0 | 1 0 1 0 |
| 0 1 0 1 | 1 0 1 1 |
| 0 1 1 0 | 1 1 0 1 |
| 0 1 1 1 | 1 1 1 0 |
| 1 0 0 0 | 1 1 1 1 |
| 1 0 0 1 | 1 1 1 1 |

| | | | | | | | | | | | | |
|---|---|---|---|---|---|---|---|---|---|---|---|---|
| 20% | 10% | 10% | 30% | 30% | 50% | 20% | 30% | 30% | 50% | 30% | 40% | 40% |
| 50% | 40% | 50% | 60% | 50% | 40% | 60% | 40% | 40% | 60% | 60% | 40% | 50% |
| 40% | 50% | 60% | 50% | 50% | 50% | 50% | 60% | 60% | 50% | 50% | 50% | 40% |
| 20% | 50% | 60% | 40% | 40% | 50% | 50% | 40% | 40% | 60% | 40% | 40% | 60% |
| 40% | 40% | 60% | 60% | 40% | 60% | 40% | 60% | 60% | 50% | 60% | 30% | 40% |
| 50% | 50% | 40% | 50% | 40% | 40% | 40% | 50% | 40% | 50% | 60% | 30% | 40% |
| 50% | 50% | 40% | 60% | 40% | 60% | 60% | 50% | 50% | 40% | 40% | 50% | 50% |
| 40% | 50% | 50% | 40% | 60% | 40% | 60% | 60% | 60% | 50% | 60% | 60% | 30% |
| 50% | 40% | 50% | 50% | 50% | 50% | 50% | 40% | 50% | 50% | 40% | 60% | 40% |
| 40% | 60% | 60% | 40% | 50% | 50% | 60% | 50% | 40% | 50% | 50% | 60% | 40% |
| 50% | 40% | 60% | 60% | 50% | 50% | 60% | 60% | 50% | 50% | 60% | 50% | 40% |
| 50% | 50% | 50% | 50% | 60% | 50% | 50% | 60% | 50% | 40% | 40% | 50% | 50% |
| 30% | 50% | 50% | 50% | 50% | 50% | 30% | 50% | 60% | 50% | 50% | 50% | 40% |
| 40% | 60% | 60% | 50% | 50% | 50% | 50% | 40% | 60% | 50% | 40% | 60% | 50% |
| 20% | 30% | 60% | 40% | 40% | 60% | 40% | 40% | 60% | 50% | 60% | 60% | 40% |
| 50% | 60% | 60% | 50% | 40% | 50% | 50% | 50% | 50% | 50% | 50% | 50% | 40% |
| 50% | 40% | 50% | 60% | 50% | 60% | 60% | 50% | 40% | 40% | 50% | 50% | 60% |
| 60% | 50% | 50% | 50% | 50% | 60% | 50% | 60% | 60% | 40% | 50% | 60% | 40% |
| 60% | 50% | 50% | 60% | 60% | 60% | 50% | 50% | 50% | 50% | 50% | 50% | 50% |
| 50% | 60% | 50% | 50% | 60% | 40% | 60% | 60% | 60% | 50% | 60% | 60% | 50% |
| 50% | 50% | 60% | 60% | 60% | 60% | 50% | 60% | 40% | 60% | 60% | 60% | 60% |
| 60% | 50% | 50% | 20% | 60% | 50% | 60% | 60% | 50% | 60% | 60% | 60% | 50% |
| 60% | 60% | 50% | 50% | 60% | 50% | 50% | 50% | 50% | 30% | 50% | 60% | 40% |
| 40% | 50% | 30% | 30% | 50% | 40% | 40% | 60% | 50% | 30% | 50% | 50% | 50% |
| 60% | 50% | 50% | 60% | 50% | 50% | 50% | 30% | 50% | 60% | 40% | 40% | 50% |
| 30% | 30% | 50% | 40% | 40% | 60% | 50% | 30% | 50% | 50% | 50% | 60% | 50% |
| 50% | 60% | 50% | 50% | 50% | 30% | 50% | 60% | 40% | 40% | 50% | 30% | 30% |
| 50% | 40% | 40% | 60% | 50% | 30% | 50% | 50% | 50% | 60% | 50% | 50% | 60% |
| 50% | 50% | 50% | 30% | 50% | 60% | 40% | 40% | 50% | 30% | 30% | 50% | 40% |
| 40% | 60% | 50% | 30% | 50% | 50% | 50% | 60% | 50% | 50% | 60% | 50% | 50% |
| 50% | 30% | 50% | 60% | 40% | 40% | 50% | 30% | 30% | 50% | 40% | 40% | 60% |
| 50% | 30% | 50% | 50% | 50% | 60% | 50% | 50% | 60% | 50% | 50% | 50% | 30% |
| 50% | 60% | 40% | 40% | 50% | 30% | 30% | 50% | 40% | 40% | 60% | 50% | 30% |

-continued

| | | | | | | | | | | | | |
|---|---|---|---|---|---|---|---|---|---|---|---|---|
| 50% | 50% | 50% | 60% | 50% | 50% | 60% | 50% | 50% | 50% | 30% | 50% | 60% |
| 40% | 40% | 50% | 30% | 30% | 50% | 40% | 40% | 60% | 50% | 30% | 50% | 50% |
| 50% | 60% | 50% | 50% | 60% | 50% | 50% | 50% | 30% | 50% | 60% | 40% | 40% |
| 50% | 30% | 30% | 50% | 40% | 40% | 60% | 50% | 30% | 50% | 50% | 50% | 60% |
| 50% | 50% | 60% | 50% | 50% | 50% | 30% | 50% | 60% | 40% | 40% | 50% | 30% |
| 30% | 50% | 40% | 40% | 60% | 50% | 30% | | | | | | |

h_value 0 0 0 1
0 0 1 1
0 1 0 1
0 0 0 1
1 0 1 1
1 0 1 1
1 1 0 1
1 1 1 1
1 1 1 1
1 1 1 1 layer number = 0

| | | | |
|---|---|---|---|
| 5 | 5 | 4 | 4 |
| 9 | 3 | 6 | 0 |
| 5 | 5 | −4 | 5 |
| 6 | 4 | 4 | 4 |

weight 2

| | | | |
|---|---|---|---|
| −5 | −5 | 1 | 4 |
| −9 | 0 | −5 | 4 |
| −5 | −4 | 5 | −4 |
| −2 | 5 | 5 | 6 |

new input 0 0 0 0 0 0 0 1
0 0 0 1 0 0 1 1
0 0 1 0 0 1 0 1
0 0 1 1 0 0 0 1
0 1 0 0 1 0 1 1
0 1 0 1 1 0 1 1
0 1 1 0 1 1 0 1
0 1 1 1 1 1 1 1
1 0 0 0 1 1 1 1
1 0 0 1 1 1 1 1

| | | | | | | | | | | | | |
|---|---|---|---|---|---|---|---|---|---|---|---|---|
| 20% | 10% | 30% | 50% | 40% | 60% | 60% | 60% | 60% | 70% | 60% | 70% | 60% |
| 60% | 60% | 70% | 70% | 60% | 70% | 70% | 70% | 60% | 70% | 60% | 60% | 70% |
| 60% | 50% | 60% | 70% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | | | | | | |

h_value 0 0 0 1
0 0 1 1
0 1 0 1
1 0 0 0

-continued 1 0 1 0
1 0 1 1
1 1 0 1
1 1 1 1
1 1 1 1
1 1 1 1 layer number = 1

| | | | | | | | |
|---|---|---|---|---|---|---|---|
| 4 | 4 | 4 | 4 | 0 | 0 | 0 | 0 |
| 5 | 2 | 4 | 0 | 1 | 4 | 0 | 1 |
| 3 | 3 | −3 | 3 | 1 | 0 | 3 | 0 |
| 3 | 0 | −3 | 1 | 1 | 6 | 0 | 2 |

weight 2

| | | | | | | | |
|---|---|---|---|---|---|---|---|
| 2 | 2 | −2 | −2 | −7 | 0 | 0 | 0 |
| −5 | 0 | −3 | 3 | −1 | −5 | 0 | 0 |
| −2 | −2 | 6 | −3 | −1 | 0 | −3 | 0 |
| −3 | 1 | 4 | −1 | 1 | −4 | 3 | 0 |

new input 0 0 0 0 0 0 0 1
0 0 0 1 0 0 1 1
0 0 1 0 0 1 0 1
0 0 1 1 1 0 0 0
0 0 1 1 1 0 0 0
0 1 0 0 1 0 1 0
0 1 0 1 1 0 1 1
0 1 1 0 1 1 0 1
0 1 1 1 1 1 1 1
1 0 0 0 1 1 1 1
1 0 0 1 1 1 1 1

| | | | | | | | | | | | | |
|---|---|---|---|---|---|---|---|---|---|---|---|---|
| 20% | 40% | 40% | 80% | 80% | 70% | 70% | 90% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 80% | 60% | 80% |
| 80% | 60% | 80% | 60% | 60% | 80% | 60% | 80% | 80% | 60% | 80% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | 60% | 80% | 80% | 60% | 80% | 80% |
| 60% | 80% | 80% | 60% | 80% | 80% | 60% | 80% | 80% | 60% | 80% | 80% | 60% |
| 80% | 80% | 60% | 80% | 80% | 60% | 80% | 80% | 60% | 80% | 80% | 60% | 80% |
| 80% | 60% | 80% | 80% | 60% | 80% | 80% | | | | | | |

h_value 0 0 0 0
0 0 1 1
0 1 0 1
1 0 0 0
1 0 1 0
1 0 1 1
1 1 0 1
1 1 1 1
1 1 1 1
1 1 1 1 layer number = 2

| | | | | | | | |
|---|---|---|---|---|---|---|---|
| 4 | 4 | 4 | 4 | 0 | 0 | 0 | 0 |
| 6 | 1 | 4 | −1 | 0 | 5 | 0 | 0 |

-continued

| | | | | | | | |
|---|---|---|---|---|---|---|---|
| 3 | 2 | −4 | 3 | 1 | 0 | 3 | 0 |
| 3 | 0 | −3 | 1 | 1 | 5 | 0 | 3 |

weight 2

| | | | | | | | |
|---|---|---|---|---|---|---|---|
| 0 | 0 | 0 | 0 | −10 | 1 | −2 | 3 |
| −5 | −1 | −3 | 1 | −1 | −5 | 0 | −1 |
| −3 | −2 | 3 | −3 | −1 | 0 | −3 | 0 |
| −4 | 0 | 4 | −1 | 0 | −4 | 1 | −1 |

new input 0 0 0 0 0 0 0 0
0 0 0 1 0 0 1 1
0 0 1 0 0 1 0 1
0 0 1 1 1 0 0 0
0 1 0 0 1 0 1 0
0 1 0 1 1 0 1 1
0 1 1 0 1 1 0 1
0 1 1 1 1 1 1 1
1 0 0 0 1 1 1 1
1 0 0 1 1 1 1 1

20% 10% 60% 90% 90% 90% 90% 90% 90% 90% 100% h_value 0 0 0 0
0 0 1 1
0 1 0 1
1 0 0 0
1 0 1 0
1 0 1 1
1 1 0 1
1 1 1 0
1 1 1 1
1 1 1 1 layer number = 3

| | | | | | | | |
|---|---|---|---|---|---|---|---|
| 4 | 4 | 4 | 4 | 0 | 0 | 0 | 0 |
| 5 | 0 | 4 | −1 | 0 | 6 | −1 | 0 |
| 2 | 2 | −4 | 3 | 0 | 0 | 4 | 0 |
| 3 | −1 | −4 | 0 | 0 | 3 | −1 | 4 |

weight 2

| | | | | | | | |
|---|---|---|---|---|---|---|---|
| −1 | −1 | 0 | 0 | −10 | 0 | −2 | 3 |
| −4 | −1 | −3 | 0 | −1 | −5 | 0 | −1 |
| −3 | −3 | 2 | −3 | −1 | 0 | −4 | 0 |
| −3 | 0 | 4 | 0 | 1 | −2 | 2 | −3 |

recall 0 0 0 0
0 0 1 1
0 1 0 1
1 0 0 0
1 0 1 0
1 0 1 1
1 1 0 1
1 1 1 0
1 1 1 1
1 1 1 1

Input file name is "s"
Connection type is 2
Max. weight sum=40
Number of learnings=300
Initial weight value=0
Max. weight is used
Displayed percent is a variable unit
Delta weight is uninitialized

| | |
|---|---|
| 0 0 0 0 | 0 0 0 0 |
| 0 0 0 1 | 0 0 1 1 |
| 0 0 1 0 | 0 1 0 1 |
| 0 0 1 1 | 1 0 0 0 |
| 0 1 0 0 | 1 0 1 0 |
| 0 1 0 1 | 1 0 1 1 |
| 0 1 1 0 | 1 1 0 1 |
| 0 1 1 1 | 1 1 1 0 |
| 1 0 0 0 | 1 1 1 1 |
| 1 0 0 1 | 1 1 1 1 |

20% 10% 10% 30% 30% 50% 30% 30% 40% 40% 40% 30% 50%
50% 50% 50% 50% 50% 50% 50% 50% 50% 60% 50% 20% 50%
50% 50% 40% 40% 50% 50% 30% 30% 30% 50% 60% 40% 40%
40% 50% 50% 40% 30% 20% 60% 60% 40% 40% 30% 50% 50%
30% 30% 30% 60% 60% 40% 40% 40% 50% 30% 30% 30% 60%
40% 40% 40% 60% 60% 30% 20% 40% 50% 50% 40% 40% 60%
60% 40% 30% 50% 50% 40% 40% 40% 60% 40% 30% 30% 60%

-continued

50% 50% 50% 50% 50% 50% 50% 50% 60% 50% 60% 60% 40%
60% 60% 50% 40% 50% 50% 50% 40% 40% 60% 50% 40% 30%
40% 40% 40% 50% 50% 40% 50% 50% 40% 30% 60% 70% 60%
40% 30% 60% 60% 40% 30% 50% 50% 60% 50% 30% 30% 50%
50% 60% 60% 30% 20% 30% 60% 40% 40% 50% 40% 40% 50%
60% 50% 60% 60% 50% 50% 60% 70% 60% 30% 50% 50% 60%
60% 70% 40% 50% 50% 60% 50% 60% 50% 50% 40% 60% 60%
70% 60% 60% 50% 70% 60% 60% 50% 60% 60% 70% 60% 60%
40% 50% 50% 50% 60% 60% 60% 70% 50% 50% 50% 50% 60%
60% 60% 60% 50% 60% 60% 50% 70% 60% 60% 60% 50% 50%
50% 70% 60% 70% 70% 50% 60% 70% 50% 60% 60% 40% 50%
60% 40% 60% 60% 60% 60% 70% 70% 60% 60% 60% 50% 50%
50% 60% 60% 50% 60% 60% 60% 60% 60% 60% 60% 60% 50%
60% 50% 50% 50% 60% 50% 60% 60% 60% 60% 60% 60% 60%
60% 60% 60% 60% 50% 50% 60% 60% 40% 40% 50% 50% 40%
40% 60% 40% 50% 60% 60% 60% 50% 50% 50% 50% 40% 60%
50% 50% h_value 0 0 0 0
0 0 1 1
0 1 0 0
1 0 0 0
1 0 1 0
1 0 1 0
1 1 0 0
1 1 1 0

-continued

```
1111
1111
```

layer number = 0

```
10 9  9 10
18 8 12  0
10 10 -8 10
20 4  4  9
```

weight 2

```
-10 -8  5  4
-19  0 -6 14
 -9 -9 14 -6
-20  6  6  4
```

new input

```
00000000
00010011
00100100
00111000
01001010
01011010
01101100
01111110
10001111
10011111
```

```
20% 20% 30% 50% 60% 70% 60% 60% 70% 60% 60% 70% 80%
70% 60% 70% 80% 90% 70% 80% 80% 80% 80% 80% 80% 80%
70% 80% 60% 80% 70% 80% 60% 80% 80% 80% 70% 80% 80%
80% 70% 80% 90% 90% 80% 90% 90% 90% 90% 80% 80% 90%
90% 80% 80% 80% 70% 80% 80% 70% 80% 80% 90% 80% 70%
80% 90% 70% 80% 80% 80% 80% 90% 90% 80% 80% 90% 90%
80% 80% 90% 80% 80% 80% 80% 80% 80% 70% 80% 70% 70%
80% 80% 90% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80% 80% 80% 80% 80% 80% 80% 80% 80% 80% 80% 80%
80% 80%
```

h_value

```
0000
0011
0101
1000
1010
1011
1101
1111
1111
1111
```

layer number = 1

```
 99  9900  00
135 11008  00
 79 -4720  61
 87  0604 -65
```

weight 2

```
 -3 -6  0  3 -18  0 -1   6
-10  0 -6 10   0 -10 0   0
 -4 -7 14 -5  -1  0 -6   0
  0  0 11  0  -1 -8  7 -10
```

new input

```
00000000
00010011
00100101
00111000
01001010
01011011
01101101
01111111
10001111
10011111
```

```
20% 30% 70% 90% 90% 90% 100%
```

h_value

```
0000
0011
0101
1000
1010
1011
1101
1110
1111
1111
```

layer number = 2

```
 99  9  9  1  0  00
133 10 -1  0 10 -10
 78 -8  7  1 -1  70
 90 -5  2 -2  2 -69
```

weight 2

```
-6 -8 -1  0 -15 -2 -4   1
-9 -1 -7  3  -2 -11 -1 -3
-6 -7  7 -6  -3 -1 -8  -2
-4  3 10  0   0 -4  4 -11
```

recall

```
0000
0011
0101
1000
1010
1011
1101
1110
1111
1111
```

Input file name is "s"
Connection type is 2
Max. weight sum=40
Number of learnings=500
Initial weight value=0
Max. weight is used
Displayed percent is a variable unit
Delta weight is uninitialized

```
0000  0000
0001  0011
0010  0101
0011  1000
0100  1010
0101  1011
0110  1101
0111  1110
1000  1111
1001  1111
```

```
20% 10% 10% 30% 30% 50% 30% 30% 40% 40% 40% 30% 50%
50% 50% 50% 50% 50% 50% 50% 50% 50% 60% 50% 20% 50%
50% 50% 40% 40% 50% 50% 30% 30% 30% 50% 60% 40% 40%
40% 50% 50% 40% 30% 20% 60% 60% 40% 40% 30% 50% 50%
30% 30% 30% 60% 60% 40% 40% 40% 50% 30% 30% 30% 60%
40% 40% 40% 60% 60% 30% 20% 40% 50% 50% 40% 40% 60%
60% 40% 30% 50% 50% 40% 40% 40% 60% 40% 30% 30% 60%
50% 50% 50% 50% 50% 50% 50% 50% 60% 50% 60% 60% 40%
60% 60% 50% 40% 50% 50% 50% 40% 40% 60% 50% 40% 30%
40% 40% 40% 50% 50% 40% 50% 50% 40% 30% 60% 70% 60%
40% 30% 60% 60% 40% 30% 50% 50% 60% 50% 30% 30% 50%
50% 60% 60% 30% 20% 30% 60% 40% 40% 50% 40% 40% 50%
60% 50% 60% 60% 50% 50% 60% 70% 60% 30% 50% 50% 60%
60% 70% 40% 50% 50% 60% 50% 60% 50% 50% 40% 60% 60%
70% 60% 60% 50% 70% 60% 60% 50% 60% 60% 70% 60% 60%
40% 50% 50% 50% 60% 60% 60% 70% 50% 50% 50% 50% 60%
```

-continued

60% 60% 60% 50% 60% 60% 50% 70% 60% 60% 60% 50% 50%
50% 70% 60% 70% 70% 50% 60% 70% 50% 60% 60% 40% 50%
60% 40% 60% 60% 60% 60% 70% 70% 60% 60% 60% 50% 50%
50% 60% 60% 50% 60% 60% 60% 60% 60% 60% 60% 60% 50%
60% 50% 50% 50% 60% 50% 60% 60% 60% 60% 60% 60% 60%
60% 60% 60% 60% 50% 50% 60% 60% 40% 40% 50% 50% 40%
40% 60% 40% 50% 60% 60% 60% 50% 50% 50% 50% 40% 60%
50% 50% 40% 60% 40% 40% 60% 50% 50% 50% 60% 60% 50%
60% 60% 50% 60% 50% 50% 40% 60% 60% 50% 50% 50% 50%
50% 50% 60% 60% 60% 60% 60% 50% 50% 50% 50% 60% 60%
60% 40% 70% 60% 60% 60% 60% 50% 50% 60% 60% 70% 50%
50% 50% 50% 50% 50% 50% 60% 60% 60% 50% 50% 50% 50%
60% 60% 60% 60% 60% 60% 60% 60% 60% 60% 60% 60% 60%
60% 40% 60% 50% 50% 40% 60% 40% 50% 40% 40% 40% 60%
40% 40% 50% 50% 40% 30% 50% 50% 40% 50% 60% 40% 50%
50% 50% 50% 50% 50% 70% 60% 50% 40% 50% 60% 40% 50%
60% 50% 40% 40% 60% 50% 50% 50% 60% 50% 30% 60% 50%
50% 50% 50% 50% 60% 50% 50% 60% 50% 60% 60% 60% 40%
60% 60% 50% 50% 60% 50% 50% 60% 50% 60% 50% 50% 60%
60% 60% 60% 60% 60% 60% 60% 60% 60% 60% 60% 60% 60%
60% 60% 60% 60% 50% 60% 50% 50% 40% 60% 60% 50% 40%
60% 60% 40% 60% 60% 50% 60% 50% 60% 60% 60% 60% 50%
60% 70% 60% 50% 60% 50% 50% h_value 0 0 0 0
0 0 1 1
0 1 0 1
0 0 0 1
1 0 1 1
1 0 1 1
1 1 0 1
1 1 1 1
1 1 1 1
1 1 1 1 layer number = 0

9 10 9 10
18 8 12 0
10 10 −8 10
15 8 8 8 weight 2

1 −21 8 7
−19 0 −6 14
−9 −9 14 −6
−20 6 6 6 new input 0 0 0 0 0 0 0 0
0 0 0 1 0 0 1 1
0 0 1 0 0 1 0 1
0 0 1 1 0 0 0 1
0 1 0 0 1 0 1 1
0 1 0 1 1 0 1 1
0 1 1 0 1 1 0 1
0 1 1 1 1 1 1 1
1 0 0 0 1 1 1 1
1 0 0 1 1 1 1 1

20% 10% 40% 50% 30% 70% 40% 60% 60% 80% 60% 70% 80%
70% 90% 80% 80% 80% 100% h_value 0 0 0 0
0 0 1 1
0 1 0 1
1 0 0 0
1 0 1 0
1 0 1 1
1 1 0 1
1 1 1 0
1 1 1 1
1 1 1 1 layer number = 1

9 10 9 9 0 0 0 0
12 5 10 0 1 7 0 1
8 8 −6 6 2 0 5 1
14 0 −3 5 −3 2 −6 4 weight 2

−4 −8 0 4 −8 4 4 −4

-continued

−8 0 −6 9 −2 −10 0 −1
−5 −6 12 −5 −3 0 −5 −1
0 5 8 2 −3 −8 −1 −9 recall 0 0 0 0
0 0 1 1
0 1 0 1
1 0 0 0
1 0 1 0
1 0 1 1
1 1 0 1
1 1 1 0
1 1 1 1
1 1 1 1

What is claimed is:

1. A MOS multi-layer neutral network receiving an m-bit input and generating an n-bit output, said neural network comprising:

an input layer having m neurons each selectively arranged to receive a corresponding bit value of said m-bit input, each neuron including first and second serially coupled CMOS inverters, an output from each first CMOS inverter being connected to an input of a corresponding second CMOS inverter to generate a non-inverted output therefrom, said output from each first CMOS inverter also providing an inverted output associated with each neuron;

an input synapse group having a plurality of transistor synapse means coupled to respective ones of said inverted and non-inverted outputs from said input layer to form a transistor group matrix, said transistor synapse means generating a plurality of output row bias signals, each transistor synapse means being assigned a predetermined weight value (current driving strength) in relation to its position along the transistor group matrix, each row in the transistor group matrix being responsive to a respective bias signal pre-assigned to provide a select unity weight value bias signal onto said each row and also being responsive to a sum bias signal from each of said transistor synapse means respectively coupled thereto and driven by corresponding ones of said inverted and non-inverted outputs, wherein each row is associated with one of said output row bias signals generated in response to the selected unity weight value bias signal and the respective sum bias signal coupled thereto;

an output layer having n neurons each selectively arranged to output a corresponding bit value of said n-bit output;

at least one hidden layer, each coupled in succession between said input layer and said output layer and including n neurons, wherein a first hidden layer of said at least one hidden layers couples first preselected n output row bias signals from said input synapse group to respective ones of its corresponding n neurons; and at least one transfer synapse group, each associated with a corresponding one of said at least one hidden layers and providing respective n first output row bias signals, each transfer synapse group having a plurality of transfer synapse means coupled to corresponding ones of inverted and non-inverted outputs from said respective n neurons and further coupled to second preselected n output row bias signals from said input synapse group to form a transfer group matrix for generating said respective first n output row bias signals, each transfer synapse means being assigned a predetermined weight value as a function of its position along the respective transfer group matrix, wherein each row in a respective transfer group matrix is coupled to either a corresponding one of the n neurons of each successive said at least one transfer synapse group or, if said respective transfer synapse group is the last in succession, then to corresponding inputs of said n neurons of said output layer, and wherein said input synapse group couples a supply voltage to each neuron of said output layer and said at least one hidden layer such that when a corresponding bit value into an input layer neuron is "1", then when a connection weight value is selected to be positive, a first supply voltage is connected with a connection strength of a corresponding connection weight value through a PMOS transistor whose gate is connected to each corresponding inverted output, and when a connection weight value is selected to be negative, a second supply voltage is connected instead through an NMOS transistor whose gate is connected to each corresponding non-inverted output, when a corresponding bit value into said input layer is "0", then when a connection weight value is selected to be positive, a first supply voltage is connected with a connection strength of a corresponding connection weight value through a PMOS transistor whose gate is connected to each corresponding non-inverted output, and when a connection weight value is selected to be negative, a second supply voltage is connected instead through an NMOS transistor whose gate is connected to each corresponding inverted output, and when said input bit value is "1" or "0" and a connection weight value is "0," nothing is connected, and wherein each transfer synapse group is composed of PMOS and NMOS transistors for connecting inverted and non-inverted neuron outputs associated therewith.

2. The MOS multi-layer neural network of claim 1, further comprising a bias synapse group for generating the respective bias signals preassigned to each input synapse group row to provide a select unity weight value bias signal, each bias signal being generated by an NMOS transistor whose gate is connected to said first supply voltage.

3. The MOS multi-layer neural network of claim 2, wherein a connection weight value is a function of a geometric aspect ratio of the respective MOS transistor (channel width/channel length).

4. The MOS multi-layer neural network of claim 1, wherein a connection weight value is an integer value.

5. The MOS multi-layer neural network of claim 1, wherein both the sum of connection weight values at each output layer neuron input ad the sum of connection weight values at each hidden layer neuron input is smaller than a fan-in value of a preceding stage neuron CMOS inverter.

* * * * *